(12) United States Patent
Moran et al.

(10) Patent No.: US 11,794,406 B1
(45) Date of Patent: Oct. 24, 2023

(54) STEREOLITHOGRAPHY ADDITIVE MANUFACTURING OF PHOTOALIGNED LIQUID CRYSTAL ELASTOMERS

(71) Applicant: Lawrence Livermore National Security, LLC, Livermore, CA (US)

(72) Inventors: Bryan D. Moran, Pleasanton, CA (US); Elaine Lee, Moraga, CA (US); Caitlyn Christian Krikorian, Livermore, CA (US); Logan Bekker, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/848,309

(22) Filed: Jun. 23, 2022

(51) Int. Cl.
| | |
|---|---|
| *B33Y 10/00* | (2015.01) |
| *B29C 64/129* | (2017.01) |
| *B33Y 80/00* | (2015.01) |
| *B29K 105/00* | (2006.01) |

(52) U.S. Cl.
CPC ............ *B29C 64/129* (2017.08); *B33Y 10/00* (2014.12); *B33Y 80/00* (2014.12); *B29K 2105/0079* (2013.01)

(58) Field of Classification Search
CPC .... C09K 2323/02; B33Y 10/00; B33Y 80/00; B29C 64/129; B29K 2105/0079
USPC ........................................................ 428/1.2
See application file for complete search history.

(56) References Cited

U.S. PATENT DOCUMENTS

| | | | |
|---|---|---|---|
| 8,748,068 B2 | 6/2014 | Kaneiwa et al. | |
| 10,703,052 B2 | 7/2020 | Erb et al. | |
| 10,987,941 B2 | 4/2021 | Goodrich et al. | |
| 11,130,288 B2 | 9/2021 | Moran | |
| 2002/0180916 A1* | 12/2002 | Schadt | G02B 5/3016 |
| | | | 349/117 |
| 2019/0077071 A1* | 3/2019 | Ware | C09D 11/107 |
| 2020/0230881 A1 | 7/2020 | Suwa | |

(Continued)

FOREIGN PATENT DOCUMENTS

WO    2015188175 A1    12/2015

OTHER PUBLICATIONS

Arriaga et al., U.S. Appl. No. 171848,237, filed Jun. 23, 2022.
(Continued)

*Primary Examiner* — Ruiyun Zhang
(74) *Attorney, Agent, or Firm* — Zilka-Kotab, P.C.

(57) ABSTRACT

A method of forming a three-dimensional structure of liquid crystal (LC) elastomers includes contacting a resin layer of LC oligomers with a layer of photoalignment material, and exposing a portion of photoalignment material to light for aligning the portion of photoalignment material in a first orientation. The LC oligomers adjacent the illuminated portion of photoalignment material align to the first orientation of the illuminated portion. The portion of aligned LC oligomers of the resin layer are cured. Operations for forming additional layers include creating a relative movement of the resin layer away from the photoalignment material, contacting another resin layer with the photoalignment material, and exposing another portion of photoalignment material to light for aligning the photoalignment material in a different orientation. The LC oligomers adjacent the illuminated portion of photoalignment material align to the different orientation, and the portion of aligned LC oligomers of the resin layer are cured.

17 Claims, 8 Drawing Sheets

(56) References Cited

U.S. PATENT DOCUMENTS

2020/0298493 A1 9/2020 Wilds et al.
2022/0097294 A1 3/2022 Suwa
2022/0355540 A1 11/2022 Meenakshisundaram et al.

OTHER PUBLICATIONS

Lall et al., "In situ, spatially variable photoalignment of liquid crystals inside a glass cell using Brilliant Yellow," Proceedings of SPIE Photosensitive Materials and their Applications II, vol. 12151, May 24, 2022, 8 pages.
Restriction Requirement from U.S. Appl. No. 17/848,237, dated Dec. 12, 2022.
Traugutt et al., "Liquid-Crystal-Elastomer-Based Dissipative Structures by Digital Light Processing 3D Printing," Advanced Materials, 2020, pp. 1-7.
Yao et al., "Multiresponsive polymeric microstructures with encoded predetermined and self-regulated deformability," PNAS, vol. 115, No. 51, Dec. 18, 2018, pp. 12950-12955.
Li et al., "Liquid-induced topological transformations of cellular microstructures," Nature, vol. 592, Apr. 15, 2021, pp. 386-391.
Anwer et al., "Orientation kinetics of thermotropic main-chain liquid-crystalline polymers in a magnetic field," Polymer, vol. 32, 1991, pp. 103-108.
Tabrizi et al., "Voxelated Molecular Patterning in Three-Dimensional Freeforms," Applied Materials & Interfaces, vol. 11, 2019, pp. 28236-28245.
Li et al., "Remotely Controlled, Reversible, On-Demand Assembly and Reconfiguration of 3D Mesostructures via liquid Crystal Elastomer Platforms," Applied Materials & Interfaces, vol. 13, 2021, pp. 8929-8939.
Ware et al., "Voxelated liquid crystal elastomers," Science, Feb. 27, 2015, vol. 347, No. 6225, pp. 982-984.
Martin et al., "Designing bioinspired composite reinforcement architectures via 3D magnetic printing," Nature Communication, Oct. 2015, pp. 1-7.
Herbert et al., "Synthesis and alignment of liquid crystalline elastomers," Nature Reviews, Materials, vol. 7, Jan. 2022, pp. 23-38.
Jackson et al., "Field responsive mechanical metamaterials," Science Advances, vol. 4, Dec. 7, 2018, pp. 1-9.
Davidson et al., "3D Printable and Reconfigurable Liquid Crystal Elastomers with Light-Induced Shape Memory via Dynamic Bond Exchange," Advanced Materials, vol. 32, 2020, pp. 1-6.
Kotikian et al., "3D Printing of Liquid Crystal Elastomeric Actuators with Spatially Programed Nematic Order," Advanced Materials, vol. 30, 2018, pp. 1-6.
Kim et al., "Printing ferromagnetic domains for untethered fast-transforming soft materials," Nature Letter, vol. 558, Jun. 14, 2018, 18 pages.
Ambulo et al., "4D-Printable Liquid Metal?Liquid Crystal Elastomer Composites," Applied Materials and Interfaces, vol. 13, 2021, pp. 12805-12813.
Xie et al., "Liquid crystal elastomers, networks and gels: advanced smart materials," Journal of Materials Chemistry, vol. 15, 2005, pp. 2529-2550.
Ohm et al., "Liquid Crystalline Elastomers as Actuators and Sensors," Advanced Materials, vol. 22, 2010, pp. 3366-3387.
Zhang et al., "4D Printing of a Liquid Crystal Elastomer with a Controllable Orientation Gradient," Applied Materials and Interfaces, vol. 11, 2019, pp. 44774-44782.
Saed et al., "Molecularly-Engineered, 4D-Printed Liquid Crystal Elastomer Actuators," Advanced Function Materials, vol. 29, 2019, pp. 1-9.
Skylar-Scott et al., "Voxelated soft matter via multimaterial multinozzle 3D printing," Nature, vol. 575, Nov. 14, 2019, 19 pages.
Zheng et al., "Ultralight, Ultrastiff Mechanical Metamaterials," Science, vol. 344, No. 6190, Jun. 20, 2014, pp. 1373-1377.
Matsumori et al., "Photoalignment of an Azobenzene-Based Chromonic Liquid Crystal Dispersed in Triacetyl Cellulose: Single-Layer Alignment Films with an Exceptionally High Order Parameter," ACS Applied Materials and Interfaces, vol. 7, 2015, pp. 11074-11078.
Lopez-Valdeolivas et al., "4D Printed Actuators with Soft-Robotic Functions," Macromolecular Rapid Communications, vol. 39, 2018, pp. 1-7.
Guo et al., "3D Microstructures of Liquid Crystal Networks with Programmed Voxelated Director Fields," Advanced Materials, vol. 32, 2020, 10 pages.
Notice of Allowance from U.S. Appl. No. 17/848,237, dated Mar. 23, 2023.
Arriaga et al., U.S. Appl. No. 18/211,514, filed Jun. 19, 2023.

* cited by examiner

STEREOLITHOGRAPHY ADDITIVE MANUFACTURING OF PHOTOALIGNED LIQUID CRYSTAL ELASTOMERS

This invention was made with Government support under Contract No. DE-AC52-07NA27344 awarded by the United States Department of Energy. The Government has certain rights in the invention.

FIELD OF THE INVENTION

The present invention relates to additive manufacturing of liquid crystal elastomers, and more particularly, this invention relates to the photoalignment of liquid crystal elastomers to form a three-dimensional structure by stereolithography additive manufacturing techniques.

BACKGROUND

Additive manufacturing (AM) of liquid crystal elastomers (LCEs) is on the rise, as is shown by the growing number of studies using direct ink write (DIW) of LCEs to form three-dimensional (3D) structures. However, DIW additive manufacturing techniques cannot achieve higher part resolution, increased part complexity, and 180° liquid crystal (LC) alignment control within local volume elements leading to 3D-to-3D shape change, which would benefit a wider range of application spaces. For example, DIW techniques may not form complex shapes such as octet truss, gyroid, etc. Moreover, DIW techniques are limited to achieving unidirectional LCE alignment and thus have not demonstrated an LCE alignment for shape change in a 3D space distinct from a shape change in a two-dimensional (2D) space. There is a need to extend LCE printing of 3D structures to stereolithography (SLA) vat polymerization. However, recent studies of printing LCEs using lithography techniques do not include alignment of the LC molecules, and thus, without alignment the resultant parts have limited 3D-to-3D shape change properties. A process to provide layer-by-layer printing with precisely controlled LC alignment throughout a printed 3D part that allows a 3D transition of the part after printing remains elusive.

SUMMARY

According to one embodiment, a method of forming a three-dimensional structure comprising liquid crystal elastomers includes contacting a first layer of resin with a layer of photoalignment material, the resin comprising liquid crystal oligomers and a photoinitiator, and exposing a first portion of the layer of photoalignment material to a first light for aligning the first portion of the layer of photoalignment material in a first orientation corresponding to a polarity of the first light. The liquid crystal oligomers adjacent the illuminated first portion of the layer of photoalignment material align to the first orientation of the first portion of the layer of photoalignment material. The method includes exposing the aligned liquid crystal oligomers of the first layer of resin for curing the aligned liquid crystal oligomers thereby forming a cured portion of the first layer of resin. For forming at least one additional layer, the following operations are repeated for each additional layer: creating a relative movement of the first layer away from the photoalignment material, contacting another layer of the resin positioned between the previously-formed layer of resin and the layer of photoalignment material with the layer of photoalignment material, and exposing another portion of the layer of photoalignment material to the first light for aligning the another portion of the layer of photoalignment material in an orientation that is different than the first orientation. The liquid crystal oligomers adjacent the illuminated another portion of the layer of photoalignment material align to the orientation of the another portion of the layer of photo alignment material. The method includes exposing the aligned liquid crystal oligomers of the another layer of resin for curing the aligned liquid crystal oligomers thereby forming a cured portion of the another layer of resin.

According to another embodiment, a product includes a three-dimensional structure having a plurality of sequentially-formed layers comprised of liquid crystal elastomers. The liquid crystal elastomers in a portion of a first of the layers are substantially aligned in a predefined first orientation and the liquid crystal elastomers in a portion of a second of the layers are substantially aligned in a predefined second orientation that is different than the first orientation. Each of the portions of the three-dimensional structure is characterized as exhibiting a shape change in response to a stimulus, wherein the shape change is reversible. The product includes a contiguous region of aligned liquid crystal elastomers in one of the portions having a maximum dimension of less than 60 microns.

Other aspects and advantages of the present invention will become apparent from the following detailed description, which, when taken in conjunction with the drawings, illustrate by way of example the principles of the invention.

DETAILED DESCRIPTION

Figure 1A:
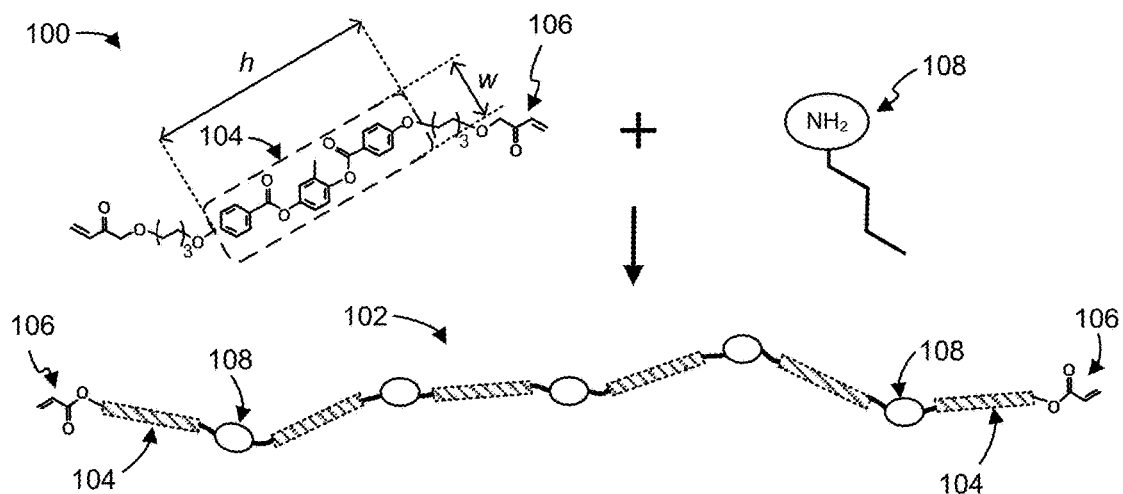
FIG. 1A is a schematic drawing of one example of liquid crystal (LC) oligomer synthesis, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt. % is defined as the percentage of weight of a particular component relative to the total weight/mass of the mixture. Vol. % is defined as the percentage of volume of a particular compound relative to the total volume of the mixture or compound. Mol. % is defined as the percentage of moles of a particular component relative to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

In addition, the present disclosure includes several descriptions of a "resin" used in an additive manufacturing process to form the inventive aspects described herein. It should be understood that "resins" (and singular forms thereof) may be used interchangeably and refer to a composition of matter comprising a plurality of oligomers, particles, small molecules, etc. coated with and dispersed throughout a liquid phase. In some inventive approaches, the resin may be optically transparent having a greater than 90% transmittance of light. In some inventive approaches, the resin is light sensitive where exposure to a particular light source changes the physical and/or chemical properties of the resin.

The following description discloses several preferred structures formed via photo polymerization processes, e.g., projection microstereolithography, photolithography, two photon polymerization, etc., or other equivalent techniques and therefore exhibit unique structural and compositional characteristics conveyed via the precise control allowed by such techniques. The physical characteristics of a structure formed by photo polymerization processes may include fabrication of a solid micro-structure having complex geometric arrangement of ligaments, filaments, etc. The formation of a three-dimensional structure includes exposing a resin to light, where a pattern in the photoresist is created by the exposing light.

The following description discloses several preferred embodiments of ink formulations for forming a three-dimensional (3D) structure of liquid crystal elastomers (LCEs) having photoaligned liquid crystals in a predefined direction, the 3D structure being capable of a shape change, and/or related systems and methods.

In one general embodiment, a method of forming a three-dimensional structure comprising liquid crystal elastomers includes contacting a first layer of resin with a layer of photoalignment material, the resin comprising liquid crystal oligomers and a photoinitiator, and exposing a first portion of the layer of photoalignment material to a first light for aligning the first portion of the layer of photoalignment material in a first orientation corresponding to a polarity of the first light. The liquid crystal oligomers adjacent the illuminated first portion of the layer of photoalignment material align to the first orientation of the first portion of the layer of photoalignment material. The method includes exposing the aligned liquid crystal oligomers of the first layer of resin for curing the aligned liquid crystal oligomers thereby forming a cured portion of the first layer of resin. For forming at least one additional layer, the following operations are repeated for each additional layer: creating a relative movement of the first layer away from the photoalignment material, contacting another layer of the resin positioned between the previously-formed layer of resin and the layer of photoalignment material with the layer of photoalignment material, and exposing another portion of the layer of photoalignment material to the first light for aligning the another portion of the layer of photoalignment material in an orientation that is different than the first orientation. The liquid crystal oligomers adjacent the illuminated another portion of the layer of photoalignment material align to the orientation of the another portion of the layer of photo alignment material. The method includes exposing the aligned liquid crystal oligomers of the another layer of resin for curing the aligned liquid crystal oligomers thereby forming a cured portion of the another layer of resin.

In another general embodiment, a product includes a three-dimensional structure having a plurality of sequentially-formed layers comprised of liquid crystal elastomers. The liquid crystal elastomers in a portion of a first of the layers are substantially aligned in a predefined first orientation and the liquid crystal elastomers in a portion of a second of the layers are substantially aligned in a predefined second orientation that is different than the first orientation. Each of the portions of the three-dimensional structure is characterized as exhibiting a shape change in response to a stimulus, wherein the shape change is reversible. The product includes a contiguous region of aligned liquid crystal elastomers in one of the portions having a maximum dimension of less than 60 microns.

A list of acronyms used in the description is provided below.
2D two-dimensional
3D three-dimensional
AM Additive manufacturing
DIW direct ink writing
DMD digital micromirror device
DWNI Dual Wavelength Negative Imaging
LC Liquid crystal
LCE Liquid crystal elastomer
ms millisecond
nm nanometer
PµSL projection micro stereolithography
SLA stereolithography
µm micron
UV ultraviolet
wt. % weight percent Liquid crystal elastomers (LCEs) combine the properties of liquid crystals (orientational order and mobility) and polymer networks (rubbery elasticity). Due to the coupling of the anisotropic liquid crystal (LC) molecules to elastomer networks, LCEs exhibit a reversible shape memory effect upon an anisotropic-to-isotropic transition, which can be triggered by external stimuli, such as temperature, light, electric field, etc. The resultant shape change may be determined by the alignment direction of the liquid crystals. Current methods are limited to alignment of LC molecules in two-dimensional LCE films that may be induced to shape change into three-dimensional space.

Moreover, current methods for printing LCEs are limited to direct ink write (DIW) additive manufacturing methods. DIW printing of LCEs involves shear and extensional forces during extrusion that unidirectionally align the LC molecules along the printing direction. The alignment of the liquid crystals in the LCE is randomized when heated above their nematic-to-isotropic transition temperature, and then during extrusion, the LC molecules are aligned along the printing direction. As the strand is printed, it cools to room temperature and is cured with ultraviolet (UV) light, thereby fixing the orientation of the LC molecule alignment. When heated, the shape change of the printed strand is limited to contraction along the filament axis and expansion perpendicular to the filament axis.

An additional drawback of DIW additive manufacturing methods include a restriction of feature size resolution. The feature size of DIW printed parts are limited by the diameter of the nozzle for extruding the filament. Thus, typical features sizes of DIW printed parts are about 250 microns (µm). There is a need for greater control of LC alignment beyond the as-deposited alignment afforded by DIW printing techniques to enable 3D to 3D shape change for a wider range of application spaces, and a need for higher part resolution and increased part complexity.

In preferred approaches, during the process of printing as described herein, LCs are substantially aligned in a predefined orientation, different than the orientation of the as-deposited alignment direction of the LC oligomers. The substantially aligned LC oligomers are cured during the printing process in order to set the aligned LC molecules in an elastic network. In so doing, the LCEs respond to environmental stimuli and induce a shape change of the printed structure to an extent determined by a predefined orientation of the aligned LC molecules in the LCE matrix.

In one embodiment, a method using a stereolithography (SLA) additive manufacturing technique is capable of forming a 3D printed part having a predefined pattern of voxels, where each voxel is comprised of LC molecules substantially aligned in a predefined orientation. A voxel is a local volume element that adds a third dimension (z-dimension) to a two-dimensional (2D) pixel (x-y dimensions). In various approaches, the SLA process allows for printing a 3D structure voxel-by-voxel and each voxel has LCs substantially aligned in a unique predefined orientation resulting in a 3D structure having multiple regions (e.g., each voxel) of LCs substantially aligned in a different orientation. Further, the SLA process includes forming voxels having substantially aligned LCs in an orientation specifically defined for inducing a shape change in the printed part with a higher actuation of strain % (e.g., up to about 50% strain) in response to environmental stimuli. Shape change may be measured as strain in multiple directions. For example, in DIW printing techniques, an extruded filament, when heated, may contract along its axis and expand perpendicular to its axis. However, as described in various embodiment herein, shape change may be exhibited in each part of the 3D structure and/or the 3D structure as a whole in many directions according to a complex alignment map.

Recent reports that have not demonstrated alignment of LCs during SLA printing of LCE material have resulted in forming 3D structures that cannot undergo shape change. Moreover, main chain LCEs aligned using conventional processes have failed to exhibit shape change above a 2% change in at least one dimension of the formed material.

Only studies that were limited to forming a 2D thin film of LCEs have demonstrated laser-induced photoalignment of a single layer of LCEs. These studies have not been able to demonstrate forming a 3D structure having more than one layer of aligned LCE material.

According to various embodiments described herein, a method of printing substantially aligned LCEs that are capable of a high strain percentage uses an SLA technique combined with voxel-by-voxel polarized light for aligning LCEs according to a predefined pattern layer-by-layer for forming a multi-layered 3D printed part. The resultant 3D structure is characterized as exhibiting a shape change in response to a stimulus. The reversible shape change in the 3D structure may be realized with a formulation having a high actuation strain %, e.g., up to about 50% strain.

According to various embodiments, a formulation of a resin for forming a 3D structure includes LC oligomers, such as main chain LC oligomers, side chain LC oligomers, or a combination of main chain and side chain LC oligomers. In some approaches, an LC oligomer may be synthesized to include at least one mesogen having reactive end groups that combine with chain extender molecules to form a LC oligomer, e.g., a main chain liquid crystal oligomer, LC polymer, etc. A resin formulation may include LC oligomers formed with mesogens and chain extender molecules, where the mesogens have reactive end groups. In one approach of the formulation of a resin, an LC oligomer may include one repeat unit of the mesogen molecule. In other approaches of the formulation of the resin, the LC oligomer may include greater than one repeat unit of the mesogen molecule. Mesogens may be obtained commercially.

As illustrated in FIG. 1A, part (a), one example of the synthesis 100 of an LC oligomer 102 includes at least one mesogen 104 having reactive end groups 106 on each end of the mesogen reacted with amine chain extender molecules 108 to form an LC oligomer 102 having at least one amine chain extender molecule 108 positioned between each mesogen 104 of the main chain with reactive end groups 106 on each end of the LC oligomer (e.g., main chain LC oligomer, LC polymer, etc.).

Theoretically, an extent of shape change of a formed 3D structure may be configured according to the aspect ratio of the mesogen molecules of the LC oligomers. The structure of the LC oligomers may be characterized by the aspect ratio and stiffness of the mesogen molecules. For example, the mesogen 104 has an aspect ratio defined by the height h to width w. A mesogen having 4 benzene rings is a stiffer molecule (having an aspect ratio h:w of about 3:1) than a mesogen with 1 or 2 benzene rings (having an aspect ratio of about 1.5:1). Upon stimulation, a mesogen molecule may reorient 90° upwards, and thus, a bigger aspect ratio of the mesogen molecule results in a greater degree of shape change. However, a higher aspect ratio of the mesogen molecules may result in a higher viscosity of the resin, and thus, a more rigid resin may inhibit printing efficiency. In a preferred approach, an aspect ratio (i.e., height to width) of the mesogens is about 3:1 to about 5:1. In some approaches, main chain LC oligomers include rigid LC mesogens with a reactive end group on each end for curing (e.g., crosslinking) the LC oligomers into LCEs. In some approaches, each LC oligomer of the resin may include about 3 to 15 mesogen molecules along the backbone of the LC oligomer.

Different mesogens may have different nematic-to-isotropic transition temperatures. For example, mesogens having a higher molecular weight, e.g., higher than a small molecule (i.e., a small molecule being <900 daltons), may result in a higher nematic-to-isotropic transition temperature. For mesogens having a nematic-to-transition temperatures of 100° C., the ratio of different mesogens may be used to lower the nematic-to-isotropic transition temperature below 100° C. Alternatively, the nematic-to-isotropic transition temperature of an LC oligomer may be raised by incorporating more rigid mesogen molecules as a part of the oligomer.

In some approaches, the ratio of mesogens to chain extender molecules in the LC oligomer (e.g., LC polymer) that comprise the resin may characterize mechanical properties of the 3D structure formed using the resin. For example, the ratio of mesogens to chain extenders may determine the extent, type, etc. of shape change of the formed 3D structure. In various approaches, the chain extender molecules between the mesogens may include amines, etc. In one approach, a ratio of mesogen to the chain extender may be about 1:1. In some approaches, a higher ratio is preferred, for example around 1.4:1 up to 2:1 mesogen to chain extender. An LC oligomer having a higher ratio of mesogens to chain extender results in shorter polymer chains, whereas an LC oligomer having a lower ratio of mesogens to chain extenders results in longer polymer chains. Longer LC oligomer chains substantially aligned and cured in a LCE matrix may result in a 3D structure having a capability of a larger shape change in response to external stimuli.

The LC oligomers, LC polymers, etc. are formed by a chain extension process including the mesogens and chain extenders with reactive end groups on each end of the formed LC oligomers. The LC oligomers are preferably formed before being added to the printing process as a resin. In some approaches, a resin may include a mixture of mesogens having reactive end groups but without a chain extender, however, the resin may be highly viscous, rigid, etc.

In some approaches, the resin may include a photoinhibitor. In one approach, a photoinhibitor may extend the pot life of the resin to about 24 hours or greater. In some approaches, a photoinhibitor may be included for controlling the print resolution in the x and/or y direction. In one approach, a photoabsorber may be included for controlling the print resolution in the z-direction.

Figure 1B:
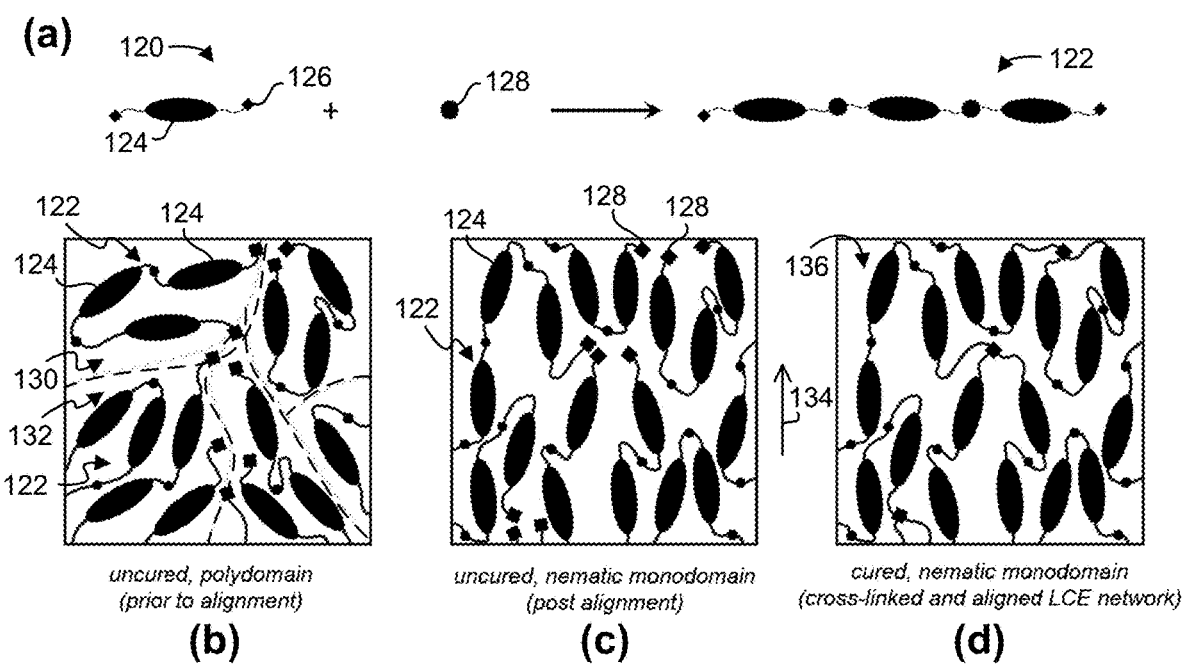
FIG. 1B is a series of schematic drawings of a magnified view of alignment of liquid crystal elastomer (LCE) material, according to various embodiments. Part (a) is a schematic drawing of an LC oligomer, part (b) is a schematic drawing of uncured, polydomain LC oligomers in a resin, part (c) is a schematic drawing of uncured, aligned nematic monodomain LC oligomers in a resin, and part (d) is a schematic drawing of a portion of cured, nematic monodomain LCEs.

As illustrated in part (a) of FIG. 1B, the synthesis 120 of main chain LC oligomers 122 includes the combination of mesogens 124 having reactive end groups 126 with chain extender molecules 128 to form an LC oligomer 122 having at least one chain extender molecule 128 positioned between the mesogens 124 and a reactive end group 126 positioned at each end of the LC oligomer 122.

Part (b) of FIG. 1B illustrates a portion of a formed layer of LC oligomers 122 prior to alignment. The LC oligomers 122 are present in the layer as a polydomain of uncured oligomers, the polydomain comprising a plurality of domains 130, 132 of LC molecules, (e.g., mesogens 124). For illustrative purposes only, the individual domains 130, 132 are defined by a dashed line between the domains. A domain 130 represents a group of LC molecules aligned in a similar orientation. The orientation of the as-deposited alignment of the resin as a layer may include a plurality of sub-domains 130, 132, e.g., a polydomain, having different, randomly aligned LC molecules, and each domain having at least one mesogen 124 oriented along a similar alignment direction. A polydomain is the isotropic state where all LCs are randomly aligned, i.e., the alignment is undefined.

Part (c) of FIG. 1B illustrates the alignment of LC oligomers corresponding to a defined orientation direction. For example, aligned LC molecules, e.g., mesogens 124, may form a nematic monodomain having an orientation in defined alignment direction 134. In one embodiment, as described herein, an orientation of aligned LC molecules may correspond to alignment of molecules of an illuminated portion of the photoalignment material that is contacting the LC molecules. As illustrated here, the mesogens 124 of the LC oligomers 122 are substantially aligned in an orientation direction 134 where a majority of, and preferably at least 90% of, the mesogens 124 are substantially aligned (e.g., within 10° of each other, preferably) in the predefined orientation direction 134 that, in some approaches, may be defined by the polarity of the light illuminating the photoalignment material.

Part (d) of FIG. 1B illustrates cured aligned LC oligomers. Curing the resin of the voxel during alignment of the LC oligomers 122 where the mesogens 124 are substantially aligned in the predefined orientation direction 134 causes the reactive end groups 126 of the LC oligomer 122 to crosslink and form an LCE 136. The LCE mesogens 136 are substantially aligned in the predefined orientation direction 134, and thus result in a cured, nematic monodomain, e.g., a crosslinked and aligned LCE network.

Figure 1C:
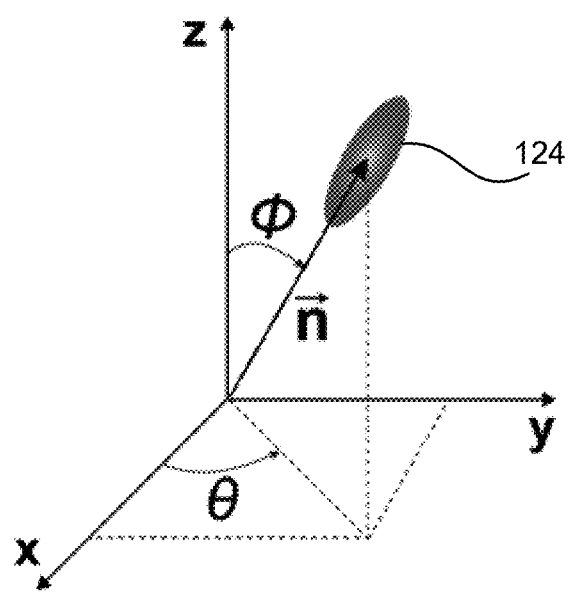
FIG. 1C is a schematic drawing of the range of orientations of liquid crystal molecules, according to one embodiment.

Referring to FIG. 1C, an orientation direction of the liquid crystal molecules, e.g., a mesogen 124 molecule, may be defined by alignment induced by photoalignment of adjacent photoalignment material. A dimensionless unit vector, e.g., liquid crystal director $\vec{n}$ describes the predominant orientation direction of nearby liquid crystals. A liquid crystal director $\vec{n}$ may be decomposed into spherical components as follows:

$$\vec{n} = \begin{cases} n_x = \cos\theta\sin\phi \\ n_y = \sin\theta\sin\phi \\ n_z = \cos\phi \end{cases}$$

where $\theta$ varies between 0° and 360°, and $\phi$ varies between 0° and 180°. A magnetic field map may be designed to target specific $\vec{n}$ directions. According to various approaches, a product may be formed voxel-by-voxel where each voxel has LC molecules oriented in unique predefined $\vec{n}$ direction. The LC molecules may be aligned in the x-y plane in 360° theta ($\theta$) direction.

Figure 2:
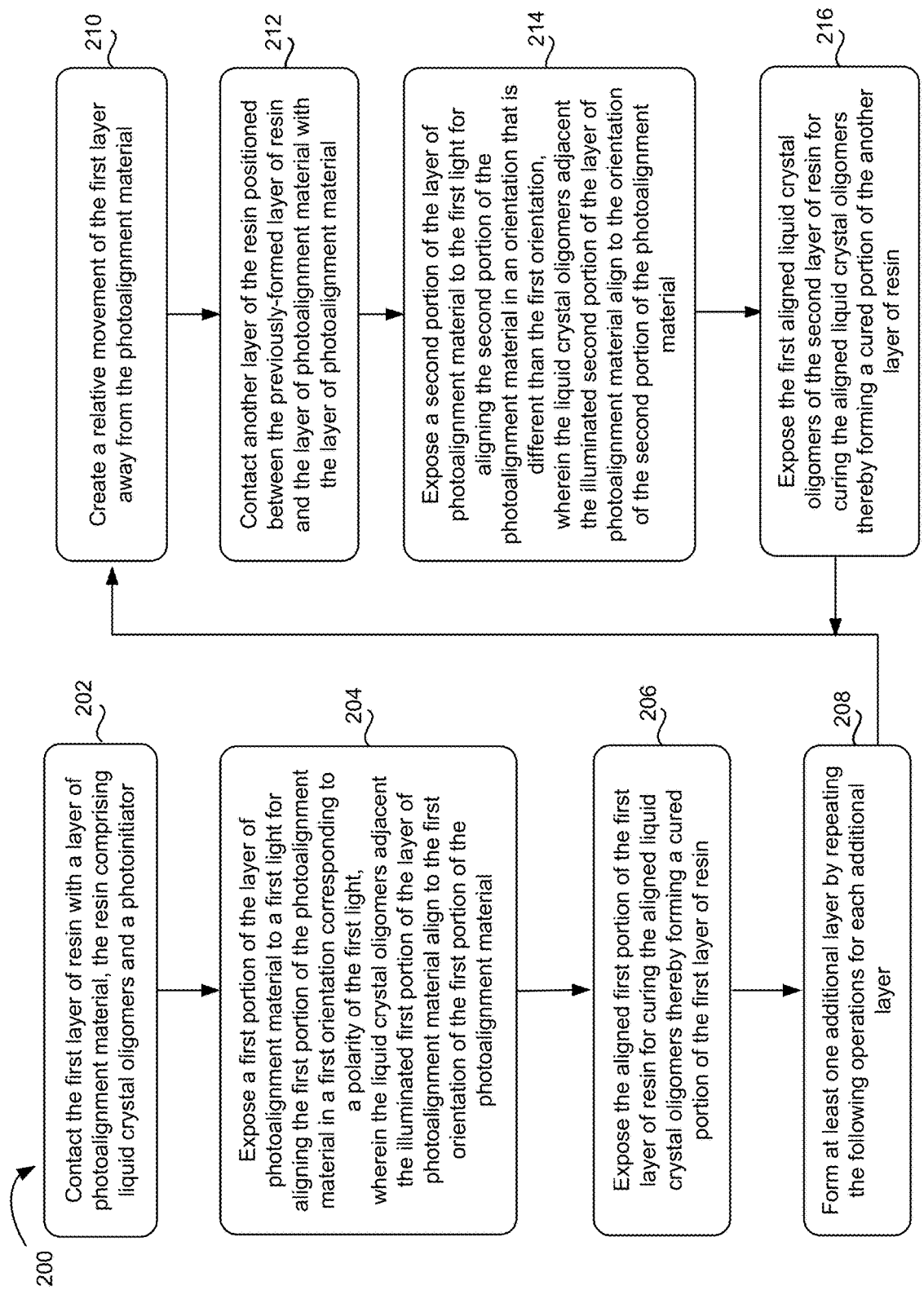
FIG. 2 is a flow chart of a method, according to one embodiment.

FIG. 2 shows a method 200 for forming a 3D structure having LCEs being substantially aligned, voxel-by-voxel, with selective 360° alignment control in the theta $\theta$ direction within the x-y plane, in accordance with one aspect of one inventive concept. The LCEs are aligned parallel to the layer of photoalignment material, parallel to the longitudinal axis of the deposition layer, etc. As an option, the present method 200 may be implemented to construct structures such as those shown in the other FIGS. described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more, or less operations than those shown in FIG. 2 may be included in method 200, according to various embodiments. It should also be noted that any of the aforementioned features may be used in any of the embodiments described in accordance with the various methods.

The method 200 may begin with operation 202 of contacting a first layer of resin with a layer of photoalignment material. As described herein, the resin includes LC oligomers and a photoinitiator. The LC oligomers may include mesogens, chain extenders, and reactive end groups. In some approaches, broadly reactive LC mesogens may include both monomer form and oligomer form. In some approaches, the resin may include a photoinhibitor and/or a photoabsorber.

The formulation of the resin of LC oligomers tends to be highly viscous at room temperature, thus the resin may be heated to increase the flowability of the resin for forming a layer. In one approach, the method 200 may include heating the resin to a temperature below the nematic-to-isotropic transition temperature of the LC oligomers for lowering the viscosity of the resin to improve efficiency of forming the layer of resin. The temperature may be sufficient to lower the viscosity of the resin without affecting a phase change of the resin (e.g., below the nematic-to-isotropic temperature of the LC oligomers). The temperature may be determined by the specific formulation of the LC resin. In preferred approaches, the resin is heated to reduce the viscosity of the resin and increase the mobility of the LC oligomers. In a preferred approach, the printing apparatus includes a chamber for heating the bath, vat, etc. of resin. In some approaches, the resin may be heated to a temperature in a range of greater than 50° C. to less than 100° C. The desired temperature may be determined by the viscosity and nematic-to-isotropic transition temperature of the formulation of the resin.

In another approach, a complex shape change dynamic may be added to the formed structure. The method may include heating the resin to a temperature above the nematic-to-isotropic transition temperature of the mesogen in order to form a portion, voxel, etc. of the layer that cannot undergo a shape change in the formed 3D structure in response to a stimulus. In some approaches, a 3D structure may include some portions that exhibit a shape change in response to a stimulus and some portions that cannot exhibit a shape change in response to a stimulus.

According to some approaches, the orientation of the longitudinal axis of the mesogen molecule is substantially aligned in an orientation corresponding to the orientation of aligned molecules of the photoalignment material. In some approaches, the orientation of the aligned LC molecules may be tuned for a specific orientation of bent core mesogens that are biaxial.

Operation 204 of method 200 includes exposing a portion, voxel, etc. of the layer of photoalignment material to a light for aligning the portion of the photoalignment material in a first orientation corresponding to a polarity of the light. In one approach, operation 204 includes exposing a first portion of the layer of photoalignment material to the wavelength band of polarized light which induces photoalignment of the photoalignment material corresponding with the polarization orientation. The liquid crystal oligomers adjacent to the now aligned photoalignment material are themselves aligned to the light induced orientation of the photoalignment materials.

In one approach, the polarity of light may be defined by a predefined rotational orientation of a polarizer positioned in the path of the light that illuminates the portion of the photoalignment material. The rotational orientation of the polarizer sets a polarization angle of the light that in turn specifies an orientation of the alignment of the molecules of the photoalignment material. Molecules of the photoalignment material align in a respective orientation corresponding to a polarity of the light applied thereto as defined, at least in part, by a rotation orientation of the polarizer in the path of the light. The polarizer may be rotated to the direction of the desired orientation of the aligned LCs. The polarizer allows a 360° control in the theta direction (FIG. 1C) within the same plane as the layer of photoalignment material. The LCs are not aligned orthogonal to the plane of the layer of photoalignment material. In one approach, the polarization angle of the first light may be selected to specify an orientation of alignment of the portion of photoalignment material corresponding to a predefined pattern of an associated layer of the 3D model.

The photoalignment molecules align to a predefined orientation defined by the rotation of the polarizer through which the light passes. The LC oligomers of the resin are sensitive to alignment of the surrounding media, thus, alignment of the photoalignment molecules translates to an alignment of LC oligomers to the orientation of the photoalignment material. In an exemplary approach, a formulation of resin includes LC oligomers that align according to the orientation of neighboring aligned photoalignment molecules. Many types of LC oligomers do not align in response to exposure to a light.

The light through that rotational polarizer is exposed onto the layer of photoalignment material, and in turn, the illuminated photoalignment material responds to the photo aligning wavelength and rotational polarizer light and subsequently aligns in the orientation determined by the light through the rotational polarizer, which then the alignment of the photoalignment layer translates to the underlying layer of LC resin and causes the LC oligomers to substantially align to the orientation of the aligned photoalignment layer.

The LC oligomers adjacent (e.g., contacting) the illuminated portion of the layer of photoalignment material align to the first orientation of the portion of the layer of photoalignment material. In one approach, heating the resin during the exposing of the first light to the photoalignment material encourages the translation of the alignment from the photoalignment layer to the LC oligomers thereby causing the molecules to move and align in a specific orientation.

In some approaches, a wavelength of the light for aligning molecules of the photoalignment material may be in a range as determined by the molecules of the photoalignment material. In preferred approaches, the photoalignment material includes molecules that undergo a photoinitiated cis-trans isomerization. For example, the photoalignment material may include azobenzene, organogel, block copolymer, etc. The photoalignment molecules respond to specific wavelength of light, e.g., 460 nm, and the molecule aligns in response to the polarization of the light. The wavelength of the light may be adjusted to a wavelength for causing alignment of the photoalignment molecules; but the wavelength for causing alignment does not overlap with the wavelength of light for crosslinking the resin.

In one approach, the wavelength of the light for causing photoalignment of the photoalignment material, e.g., the alignment light, may be in a range of about 390 nanometers (nm) to about 500 nm. In one approach, the alignment light may have a light-emitting diode (LED) source with typical LED bandwidths of approximately 20 nm to 30 nm. In other approaches, light sources such as lasers, lamps, etc. may be filtered to output the predefined wavelength ranges for alignment according to a predefined orientation. In various approaches, the photoinitiator in the resin does not initiate polymerization of the resin at a wavelength of the alignment light. In one approach, the alignment light may include a single wavelength. In another approach, the alignment light may include a small spectrum, e.g., 460 nm to 470 nm, across a range within a broader range. In another approach, the alignment light may include a broad spectrum, e.g., 390 nm to 500 nm, covering most or all of the visible range.

In various approaches, a digital micromirror device (DMD) of the apparatus illuminates a pattern of the alignment light onto a portion of the photoalignment material for aligning the molecules in the portion according to a predefined orientation. The pattern for exposure via the DMD may be determined by a layer, e.g., a 2D slice, of a 3D model of the 3D structure.

Each layer of resin may include more than one portion, voxel, etc. having LC oligomers aligned in a distinct orientation. In one approach, after exposing the first portion of the layer of photo alignment material to the alignment light, method 200 may include changing a polarity of the alignment light for exposing a next, second, another, etc. portion of the layer of photoalignment material to the alignment light. The alignment of the next portion of the layer of photoalignment material may be in a different orientation than the first orientation. The LC oligomers adjacent the illuminated portion of the layer of the photoalignment material align to the different orientation of the next portion of the layer of photoalignment material.

In some approaches, for a complex alignment pattern of LCs in one layer, a layer may receive multiple exposures to the first light passing through different rotations of the polarizer. For example, the LCs in a first portion of a layer are substantially aligned to a first orientation, then the polarizer is rotated in another direction thereby causing LCs in a second portion of the layer to be substantially aligned to a second orientation, then the polarizer may be rotated in yet another direction thereby causing LCs in a third portion of the layer to be substantially aligned to a third orientation, etc.

In one approach, a complex alignment pattern of one layer may include several voxels each having LCs substantially aligned to a first, second, third, etc. orientation, and at least one voxel that cannot exhibit a shape change in response to a stimulus.

Operation 206 of method 200 includes exposing the aligned LC oligomers of the layer of resin to a light for curing the aligned LC oligomers thereby forming a cured portion of the layer of resin. In one approach, operation 206 includes exposing the portion of the layer described in operation 204 with a second wavelength band that causes polymerization of the now aligned oligomers thereby forming a cured portion of the layer having oligomers aligned to the previous alignment orientation.

In one approach, operation 206 of curing the aligned LC oligomers of the layer of resin may occur after the LC oligomers have been substantially aligned to the predefined orientations of each voxel of the layer. For example, operation 204 is repeated for each voxel of the layer where each voxel has LCs substantially aligned to a distinct orientation until all the voxels until all the voxels of the layer have LCs substantially aligned in respective orientations, and then operation 206 is employed for curing the aligned LC oligomers of the layer.

In another approach, operation 206 of curing the aligned LC oligomers of the layer of resin may occur directly after the LC oligomers of each voxel have been substantially aligned to a predefined orientation. For example, for each voxel of a layer, operation 204 of aligning the voxel of LC oligomers via the photoalignment of a portion of the layer of photoalignment material would be followed immediately by operation 206 of curing the LC oligomers substantially aligned in the voxel, and the two operations 204 and 206 would be repeated for each voxel of the layer. Without wishing to be bound by any theory, it is believed that curing the aligned LCs of each voxel (e.g., operation 206) in between alignment operations (e.g., operation 204) would provide higher resolution of LC alignment by protecting substantially aligned LCs from being affected by neighboring alignment.

The light for curing the aligned LC oligomers, e.g., the curing light, is at a wavelength distinct from the alignment light, e.g., distinct from the wavelength of the light for illuminating the photoalignment material for aligning the LC oligomers to a specific orientation. In some approaches, the radiation may preferably be a light, a laser, a beam, etc. In an exemplary approach, LC oligomer have reactive functional end groups that enable crosslinking during exposure to radiation, e.g., UV light, and incorporate the LC oligomers into a cured liquid crystal elastomer network. Each cured portion may represent one voxel having substantially all of the LCs aligned according to one predefined orientation of alignment.

The light for curing the aligned LC oligomers may be directed onto the predefined portion by using a projector, masking the layer for exposing the portion to be cured, etc.

The wavelength of the light is within a range for causing the end groups of the LC oligomers to crosslink and form a matrix LCE material. The wavelength for curing the aligned LC oligomers may be defined by the photoinitiator included in the resin. For example, and not meant to be limiting in any way, the formulation may include 2,2-dimethoxy-2-phenylacetophenone as a photoinitiator that can initiate curing at 365 nm. In one approach, curing the aligned LC oligomers includes exposing the aligned liquid crystal oligomers to a light at a wavelength in the UV spectrum, for example, in a range of greater than about 200 nanometers up to about 389 nanometers.

In some approaches forming a layer having a complex alignment pattern, the single layer having a plurality of portions of which the LCs of each portion are substantially aligned to a respective orientation is exposed to a second light for curing, e.g., crosslinking the resin, such that the LC alignment of each of the portions is set in place.

In one approach, method 200 is for forming a structure having more than one layer of aligned LC molecules in an LCE matrix. Operation 208 includes forming at least one additional layer by repeating the following operations for each additional layer. The structure may include 2 layers, 3 layers, 4 layers, up to as many layers as determined according to a 3D model. The 3D model may be a complex geometric shape, e.g., a hollow sphere, a cylinder, a gyroid, 3D polygon structures, etc. The 3D model is divided into layers, 2D slices, etc., and each layer is formed sequentially.

In some approaches, the layer may be formed according to a predefined pattern of the printing apparatus. For example, the layer may be a 2D slice determined form a 3D model of the 3D structure to be printed. The layer may be a geometric shape according to the 2D slice of the 3D model. For example, a hollow sphere may be printed by a series of layers where the first layer is a circle, and subsequent layers are rings, and the final layer is a circle. In various approaches, the resolution of the features of each layer may be determined by the lithography additive manufacturing process. For example, the resolution of features of a layer may have a pixel pitch less than 75 µm.

The following operations may be repeated for each layer determined by the 3D model. Operation 210 of method 200 includes creating a relative movement of the first layer away from the photoalignment material. In one approach, the relative movement of the layer of resin may include moving a build plate, substrate, etc. of the printing apparatus away from the photoalignment material in a z-direction to a vat of resin for adding an additional layer above the first layer of resin having portions of cured aligned LCEs.

In another approach, after curing the portion, voxel, etc. of the resin, the relative movement of the layer may include moving the build plate, substrate, etc. in a z-direction in order to wick in, inject, etc. an addition layer of resin above the layer having cured portions of LCEs.

Moreover, in one approach, the relative movement of the layer includes moving the layer of photoalignment material in an x-direction and/or or y-direction to a location of the layer having a next portion comprised of unaligned molecules of photoalignment material, e.g., a region of the photoalignment material that is free of polarized induced aligned molecules, an unexposed portion of the layer, etc. The layer of photoalignment material may be moved by moving the transparent plate adjacent the layer of photoalignment material. In one approach, a next portion of the photoalignment layer is located by moving the layer of photoalignment material in an x-direction and/or a y-direction, and the x-y directions are in a plane that is perpendicular to the z-direction. The next portion of photoalignment material includes unaligned molecules, e.g., a portion free of polarized-induced alignment.

In another approach, the layer of photoalignment material remains associated with the layer of resin. The layers may not move in an x-direction and/or a y-direction, but rather, the light is projected in a predefined alignment pattern onto the layer of photoalignment material. The light moves in an x-direction and/or y-direction and projects an alignment pattern voxel-by-voxel onto the layer of photoalignment material for aligning LC oligomers of the layer of resin in the predefined alignment pattern.

Operation 212 includes contacting another layer of the resin positioned between the previously-formed layer of resin and the layer of photoalignment material with the layer of photoalignment material. In one approach, operation 212 may include moving the layer of previously formed layer, e.g., on a build plate, to a resin bath for forming another layer of uncured resin above the previously formed layer of resin, followed by moving the build plate with the layers of resin to contact the layer of photoalignment material. In another approach, operation 212 may include injecting, infilling, etc. a layer of uncured resin between the previously formed layer of resin and the layer of photoalignment material.

The alignment of the new layer of resin may be determined by both the alignment of the previously-formed layer and the alignment of the photoalignment layer. In one approach, another layer of the resin may be formed above the previously-formed layer of resin having at least one cured voxel of substantially aligned LCs. In another approach, another of layer of resin may be added to a space between the previously-formed layer of resin and the layer of photoalignment material. The new, uncured layer of resin contacts the layer of photoalignment material at a region, e.g., portion, of the photoalignment material that includes unaligned molecules.

Operation 214 includes exposing another portion of the layer of photoalignment material to the light for aligning another portion of the layer of photoalignment material in an orientation that is different than the first orientation. In one approach, operation 214 includes exposing of another portion of the layer of photoalignment material equivalently to another light for aligning another portion in an orientation that is different than the first orientation. In exemplary approaches, the new orientation corresponds to a differently-oriented polarity of the light. The LC oligomers of another layer of resin adjacent (e.g., contacting) the illuminated another (e.g., corresponding) portion of the layer of photoalignment material substantially align to the orientation of the corresponding portion of the layer of photoalignment material.

In one approach, the rotational orientation of the polarizer positioned in the path of the light illuminating the photoalignment layer is changed to generate a different polarization angle of light for illuminating another portion of the layer of photoalignment material. The different polarization angle of the light aligns the molecules of another portion of the layer of photoalignment material to an orientation that is different from the previous orientation of aligned molecules in the first portion of the layer of photoalignment material. In one approach, a minimum difference between the polarization angles of two respective orientations is at least one degree.

In various approaches, the polarization can be set to any rotational direction. The unpolarized light passing through the polarizer represents many photons containing all polarizations. The polarizer acts as a filter only allowing colinear light (i.e., colinear light with the polarizer axis) pass through. In some approaches, a source of polarized light may be a polarized laser. The polarization of laser light may also be rotated by other means, for example: electro-optics, an optically active crystal, by manipulation through a double dove prism pair, etc. The polarization may be rotated 180° to encompass the entire circle (e.g., a vector rotated 180° encompasses the entire 360° circle). In other words, rotation of the polarization 180° results in a full rotation.

Operation 216 includes exposing the aligned liquid crystal oligomers of another layer of resin to the second light for curing the aligned LC oligomers thereby forming a cured voxel of another of resin. The second light may be a form of radiation such as a beam, a laser, etc. Operations 210, 212, 214 and 216 may be repeated for forming each additional voxel of aligned LCs in respective predefined orientations and/or each additional layer of LCE having voxels of aligned LCs in respective predefined orientations.

Figure 3:
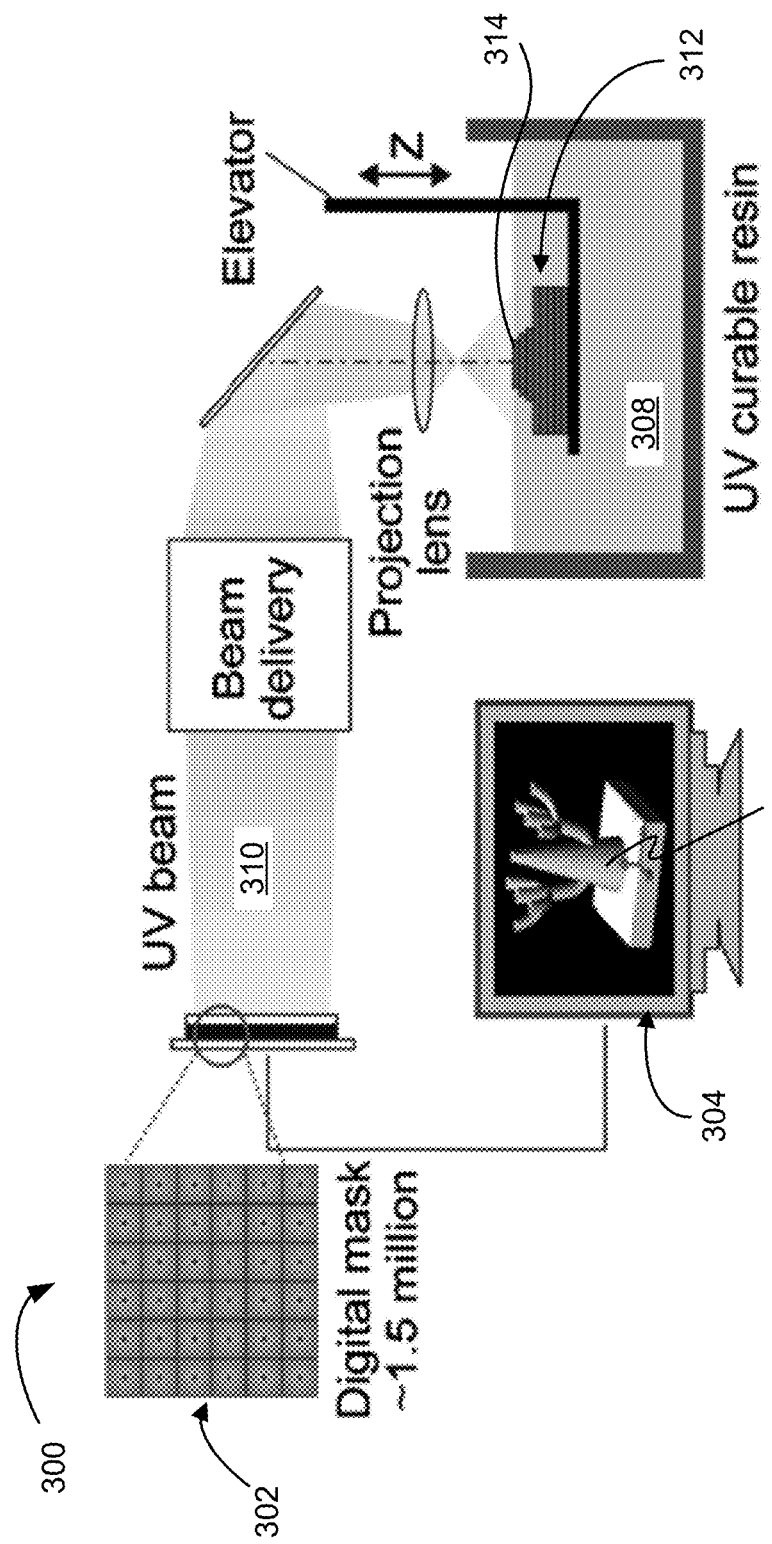
FIG. 3 is a schematic drawing of a projection microstereolithography (PµSL) vat polymerization process, according to one embodiment.

The method of forming a 3D polymer structure is highly scalable and compatible with additive manufacturing (e.g., 3D printing). According to a method described herein, the 3D structure may be formed using a lithography-based additive manufacturing (AM) system. In some approaches, AM techniques such as projection micro-stereolithography (POL) may be employed. The PµSL system 300, as illustrated in FIG. 3, uses a lithography-based technique where 2D slices, layers 302 of a 3D model 304 of a 3D object 306 are projected into a vat of photosensitive resin 308 with UV light 310, forming the final solid 3D structure 312 layer-by-layer. For example, each layer 314 may be formed according to a predefined pattern determined by a layer 302 of a 3D model 304. Printing with POL provides advantages of printing increased part complexity and resolution. Moreover, decreasing the strut diameters of a 3D printed structure while maintaining structural integrity will allow for faster actuation times of shape change of the structure.

For forming a 3D structure 312, the orientations of alignment in each layer 314 of resin 308 may correspond to a predefined pattern of an associated layer 302 of the 3D model 304. In various approaches, the product has physical characteristics of formation by an additive manufacturing technique. In various approaches, physical characteristics may include filaments arranged in a geometric pattern, a patterned outer surface defined by stacking filaments, etc. Thus, using these additive manufacturing techniques allows engineering of parts and production of optimal geometry for shape change, mechanical strength, etc.

Figure 4C:
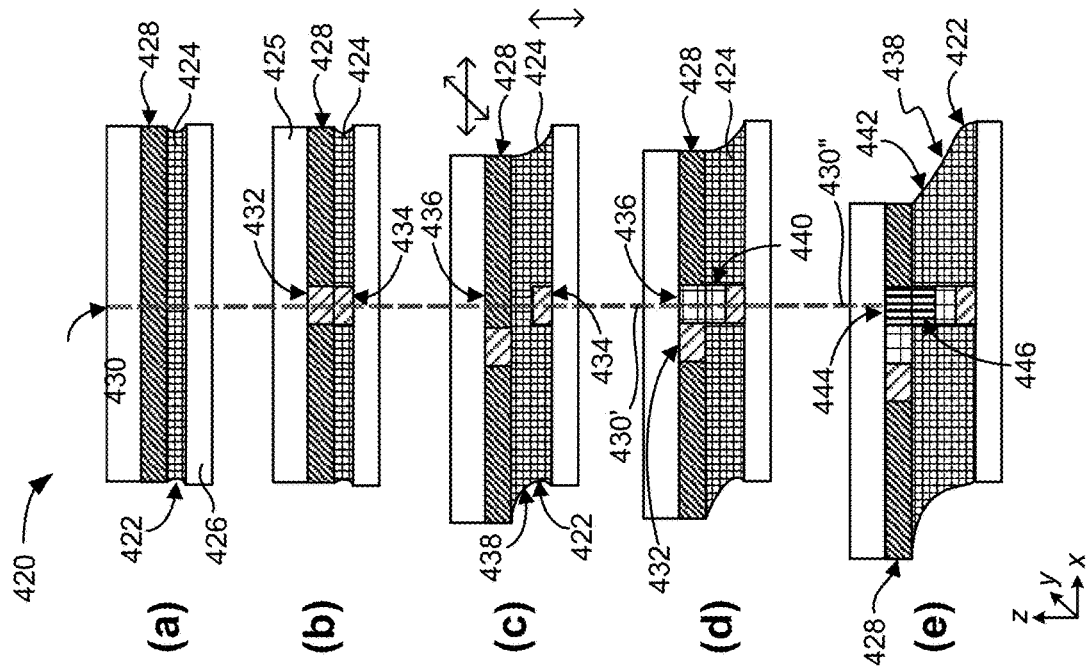
FIG. 4C is a schematic drawing of a photoalignment approach for printing voxel-by-voxel LC-aligned layers using a meniscus technique, according to one embodiment. Part (a) illustrates the forming of one layer of resin between the photoalignment material and glass plates, part (b) illustrates the alignment of molecules of the photoalignment material corresponding to alignment of LC molecules in the voxel of the resin, part (c) illustrates the addition of a another layer of resin above the first layer of resin, part (d) illustrates the alignment of molecules of a next portion of the layer of photoalignment material corresponding to a next voxel of the additional layer of resin, and part (e) illustrates the alignment of molecules in another portion of the layer of photoalignment material corresponding to another voxel of a third layer of resin.
Figure 4A:
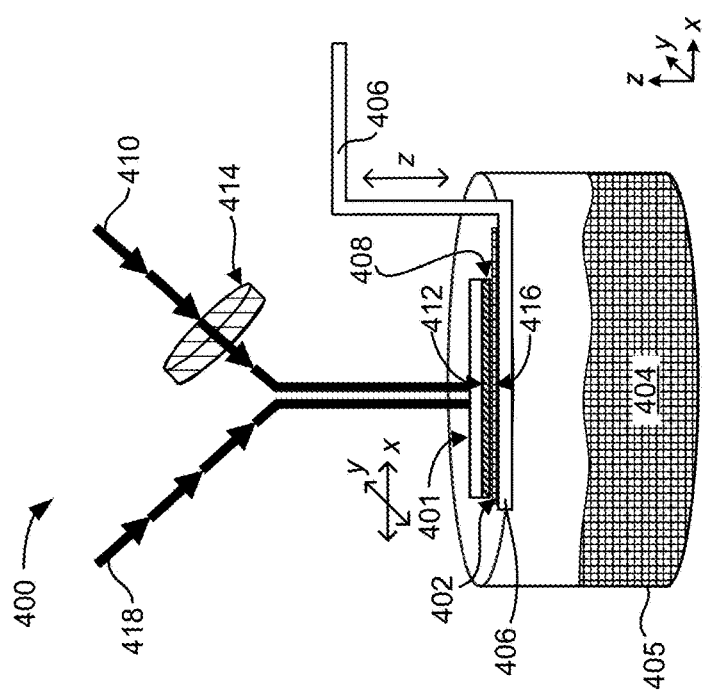
FIG. 4A is a schematic drawing of a photoalignment approach for printing voxel-by-voxel LC-aligned SLA layers, according to one embodiment.

One approach of method 200 may be implemented using a lithography-based additive manufacturing apparatus as illustrated in FIG. 4A. The PµSL-based printing process 400 describes forming a multi-layer structure voxel-by-voxel by retrofitting a Dual Wavelength Negative Imaging (DWNI, 365 nm and 460 nm) system (U.S. Pat. No. 11,130,288, incorporated by reference). The process 400 is a top-down approach, where an x-y stage 401 controls the movement of a glass plate coated with photoalignment material 408, and the photoalignment material 408 is in contact with the photosensitive LC resin 404. The resin 404 is in a shallow crystallization vat 405. A build plate 406 controls a thickness of the layer 402 and/or the spacing between the layer of photoalignment material 408 and the build plate 406.

The process 400 includes aligning LCs in a predefined pattern and curing the aligned LCs in an LCE matrix for each layer. A first layer 402 of resin 404 may be formed on a build plate 406, and the build plate 406 with the layer 402 of resin 404 may be moved in a z-direction. A layer of photoalignment material 408 is positioned on the opposite side of the layer 402 of resin 404 as the build plate 406 and allows the contacting of the first layer 402 of resin 404 with the layer of photoalignment material 408. In one approach, the process 400 includes a reconfigurable layer of photoalignment material 408.

Figure 4B:
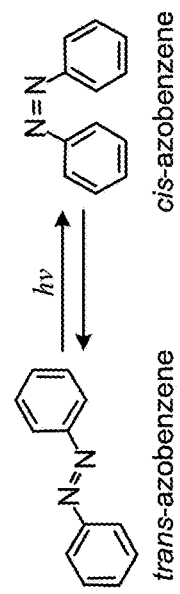
FIG. 4B is a schematic drawing of the photoisomerization of an azobenzene molecule.

In one approach, the photoalignment material includes azobenzene molecules. As illustrated in FIG. 4B, azobenzene molecules undergo photoisomerization in response to exposure to ultraviolet light. The trans form of an azobenzene molecule may be converted to the cis form using a UV wavelength of 300 to 400 nm. Visible illumination at greater than 400 nm converts the molecule back to the trans form. Alternately, the molecule will thermally relax to the stable trans form. In an exemplary approach, the alignment of the azobenzene molecules acts as a surface pattern. The LCs then align along the local surface orientation of the azobenzene molecules. This is a surface effect that is effective up to certain thicknesses (preferably greater than the thickness of the layer of resin). When LCs are sandwiched between two layers, e.g., azobenzene and a previously formed layer, the LCs may have a hybrid alignment depending on how those two layers are aligned. (e.g., if the alignments are perpendicular to each other, this would result in a twisted structure). The azobenzene photoalignment matrix aligns perpendicular to the polarizing direction.

As illustrated in FIG. 4A, the light 410 is directed onto a predefined portion 412 of the photoalignment material 408. The light 410 includes a 460 nm beam bath that includes a polarizer 414 accompanied by a rotational mount to set the polarization angle/degree. A digital micromirror device (DMD) controls which voxels are exposed in the layer of photoalignment material. The polarity of the light 410 may be defined by a rotational orientation of a polarizer 414 in the path of the light 410. The molecules in the illuminated portion 412 of the photoalignment material 408 align in the respective orientation corresponding to the polarity of light 410 defined by the rotational orientation of the polarizer 414. For example, the molecules of azobenzene in the layer of photoalignment material align perpendicular (i.e., normal) to the electric field vector of the linearly polarized light. The azobenzene molecules create nano-grooves into the surface that in turn align the underlying LC oligomers. The LC oligomers in a voxel 416 of the resin layer 402 contacting the illuminated portion 412 of the photoalignment material 408 align to the orientation of the molecules of the illuminated portion 412 of the photoalignment material. As energy is applied to align the photoalignment material 408, e.g., azobenzene, the contacting LC oligomers of the resin 404 will align concurrently.

A second light 418 for curing the resin 404 may be directed a voxel 416 (e.g., portion) of the layer 402 having LC oligomers aligned in an orientation corresponding to the orientation of aligned molecules in the illuminated portion 412 of the photoalignment material 408. For example, the second light 418 having a 365 nm exposure of the layer pattern via the DMD is projected to induce photopolymerization and freeze the LC alignment in place. The photoinitiator in the resin 404 has an absorbance tail ending at 390 nm and will not initiate polymerization at 460 nm. In some approaches, the LED wavelengths may be changed for other photo-initiating systems. The process 400 includes exposing the aligned LC oligomers in the voxel 416 of the resin layer 402 to a light for curing the aligned LC oligomers thereby forming a cured portion of the layer having LCEs substantially aligned to a predefined orientation. The second light 418 may be a light at a different wavelength than the light 410 for aligning the molecules of the photoalignment material.

The previous series of operations may be repeated for additional predefined voxels of a layer according to a 3D model of the desired 3D object. For example, in the same layer, the unaligned LC oligomers in another voxel, adjacent, proximate, etc. to the first cured voxel of aligned LCEs may be substantially aligned to a different orientation. The printing process 400 may include moving the layer of photoalignment material so that a region of the photoalignment material having unaligned molecules is contacting the new voxel of unaligned LC oligomers of the resin. In one approach, the printing process 400 may include moving the lights 418, 410 to be directed to the new voxel to be aligned of the layer 402 of resin 404. In another approach, the printing process 400 may include the lights 418, 410 to remain fixed in position, and the build plate 406 moves the layer 402 of resin 404 contacting the photoalignment material to a predefined voxel of the layer for aligning the LC oligomers in the predefined voxel via photoalignment of molecules in the adjacent illuminated photoalignment material. The orientation of the aligned LC oligomers in the another voxel may be different than the orientation of the aligned LCE in the cured first voxel in the same layer.

According to various approaches, the DMD of the lithography-based technique projects an image onto the layer of photoalignment material and the projected image defines the size of the build area for one DMD image, e.g., an illuminated area of layer of photoalignment material. The resolution of the image of the DMD sets the limit of the details which may be formed. The image includes individual pixels of the DMD. The DMD control each voxel illuminated with both the alignment light and the curing light. A controller software of the lithography system, e.g., the LabVIEW software, controls which type of light, e.g., alignment or curing, is used to illuminate the voxel. The build area is constrained by the platform size of the lithography system, the resin bath, etc.

The image of the DMD defines a contiguous region of aligned LCEs. The size of any single one of the LCE regions formed may be controlled by the magnification and image quality of the projection optics system. The minimum size of a region may be defined as approaching the diffraction limit of the optical system, e.g., in a range of about 500 nm up to 10s of microns, hundreds of microns, several millimeters, etc. The size may be determined by the magnification and quality of the projected image. The predefined size of the formed regions of LCE-aligned pixels may be controlled by the optical projection system. The predefined size of the regions of LCE-aligned pixels is a process distinct from the LCE alignment technique. The resultant size of the build area, e.g., the size of the formed part, may not be controlled by the LCE alignment technique.

In one approach, the build size of the region of LCEs may be expanded by moving the substrate via XY translation stages, followed by projecting multiple images onto different areas. In another approach, the build size may be expanded by moving the entire apparatus on a XY gantry-style translation stage and projecting multiple images onto different areas. In yet another approach, the build size may be expanded by scanning the image of the DMD by optical means by tilting galvanometer mirror pairs, scanning polygonal mirrors, etc. that may translate the image onto multiple areas. Following expansion of the build area using any one of these approaches, the LCE alignment techniques described here may be applied to the system.

In some approaches, a maximum dimension of a portion, voxel, etc. may be in a range of 2 μm to 60 μm. In one approach, a build area may be a 3 by 3 μm pixel, and possibly lower to a 1 by 1 μm pixel. The size of the build area correlates to the focus of the objective of the printing apparatus, e.g., a high magnification objection allows a smaller build area.

Forming a 3D structure includes sequentially adding layers above the cured layer of aligned LCE. In one approach, the first operation for adding another layer above the first layer include includes a relative movement of the first layer away from the photoalignment material. For example, as illustrated in FIG. 4A, the relative movement of the layer 402 of resin 404 may include moving the build plate 406 away from the photoalignment material 408 in a z-direction to a vat 405 of resin 404 for adding an additional layer above the first layer 402. For example, the build plate 406 lowers the layer 402 into the vat 405 of resin 404 to allow the new uncured resin 404 to flow over the layer 402.

The x-y stage 401 having the photoalignment material transitions, moves, etc. in and x and/or y direction to a region free of polarized induced alignment, then the build plate 406 moved in a z-direction to allow contacting of another layer (not shown) of resin with the layer of photoalignment material 408, where a new region, portion, etc. of the photoalignment material is illuminated by the first light 410. The operations of aligning the LC oligomers of the predefined voxel 416 of the first layer 402 may be repeated for aligning the LC oligomers of new predefined voxel of another layer. The orientation of aligned LC oligomers may be different than the first orientation of the align LCE of the cured voxel in the first layer. The orientation direction of alignment may be tuned by changing the polarizing angle of the polarizer 414 in the path of the first light 410.

The aligned LC oligomers of the voxels of another layer may be cured into an LCE matrix by exposure of the voxels to the second light 418, as described in the operation 206 of method 200 (FIG. 2). In one approach, the LCs of each voxel are substantially aligned to a predefined orientation and then each voxel is cured to set the alignment of the LCs in the respective voxel. In another approach, the layer is cured by exposure to a second light, where the layer comprises a plurality of voxels having aligned LCs to a predefined orientation according to each voxel.

A multi-layer 3D structure may also be formed using a method that uses a small volume of resin. FIG. 4C illustrates another approach of implementing method 200 in FIG. 2 by using a meniscus technique 420 where a layer of resin 424 is sandwiched between a build plate 426 and a top glass slide 425 with a layer of photoalignment material 428. The top glass slide 425 with the layer of photoalignment material 428 remains stationary in the z-axis, and the heated build plate 426 moves in the z-direction. The heating of the build plate assists in reducing the viscosity of the resin in order to wick in additional resin for each subsequent layer. Moreover, the heated resin will relax any shear induced alignment of the LCs during pipetting and wicking.

As illustrated in part (a), the top glass slide 425 is positioned on the opposite side of the layer of photoalignment material 428 as the layer 422 of resin 424. The resin 424 is wicked in, injected, etc., as a layer 422 between the build plate 426 and the photoalignment material 428. Each layer of resin may have a thickness in a range of about 50 to about 100 μm.

In part (b), a light (430, dashed line) is directed to a predefined portion 432 of the layer of photoalignment material 428. The light 430 aligns the polarized portion 432 in an orientation corresponding to a polarity of the light. The LC oligomers in a voxel 434 of the resin 424 contacting the illuminated portion 432 of the layer of photoalignment material 428 align to the orientation of the illuminated portion 432. The voxel 434 is cured thereby setting the alignment of the LC oligomers in the voxel 434.

As illustrated in part (c) of FIG. 4C, after curing the voxel 434 of the resin 424, a relative movement of the layer 422 may include moving the build plate 426 in a z-direction in order to wick in, inject, etc. an additional layer 438 of resin above the layer 422. Moreover, in one approach, the relative movement of the layer 422 includes moving the layer of photoalignment material 428 in an x-direction and/or or y-direction to a location of the layer having a next portion 436 comprised of unaligned molecules of photoalignment material 428. The layer of photoalignment material 428 may be moved by moving the top glass slide 425 adjacent the layer of photoalignment material 428. In one approach, a next portion 436 of the photoalignment layer is located by moving the layer of photoalignment material 428 in an x-direction and/or a y-direction, and the x-y directions are in a plane that is perpendicular to the z-direction. The next portion 436 of layer of photoalignment material includes unaligned molecules, e.g., a portion free of polarized-induced alignment.

As illustrated in part (d) of FIG. 4C, a next layer 438 of resin contacts the layer of photoalignment material 428, where a next voxel 440 of the layer 438 is adjacent (e.g., contacting) a next portion 436 of the layer of photoalignment material 428. The light 430' having a different polarity is exposed to the next portion 436 of the layer of photoalignment material 428 for aligning the next portion 436 of the layer of photoalignment material 428 in an orientation that is different than the first orientation present in the first portion 432 of the layer of photoalignment material 428. The LC oligomers of the next voxel 440 contacting the illuminated next portion 436 of the layer of photoalignment material 428 align to the orientation of the next portion 436 of the layer of photoalignment material 428. The layers 422, 438 of resin 424 include two distinct voxels of LCs aligned to respective orientations determined by a predefined polarity of light. The alignment of LCs in each voxel may be predefined and positioned in the layer of resin according to a predefined pattern of a 3D model.

As illustrated in part (e) of FIG. 4C, an additional layer 442 of resin is formed above the layer 438 having the now cured voxel 440 of aligned LCs. The layer of photoalignment material 428 is moved to another portion 444 having unaligned molecules. The additional layer 442, e.g., a third layer, contacts the layer of photoalignment material 428, where another voxel 446 of the layer 442 is adjacent (e.g., contacting) another portion 444 of the layer of photoalignment material 428. The light 430" having a different polarity is exposed to another portion 444 of the layer of photoalignment material 428 for aligning another portion 444 in an orientation that is different than the previous orientations present in the other aligned portions 432, 436 of the layer of photoalignment material 428.

The LC oligomers of another voxel 446 contacting the illuminated another portion 444 of the layer of photoalignment material 428 align to the orientation of another portion 444 of the layer of photoalignment material 428. The layer 442 is exposed to the second light for curing the aligned LC oligomers thereby forming a cured voxel 446 of the layer 442 of resin. Each of the layers 422, 438, 442 of resin 424 include a distinct voxels 434, 440, 446, respectively, each having LCs substantially aligned to respective orientation determined by a predefined polarity of light corresponding to a predefined pattern of a 3D model. In an exemplary approach, at least three layers are formed, each layer having a cured portion of LCEs. The cured portions of LCEs stacked upon one another in a direction perpendicular to a plane of the layers. In one approach, the orientation of the aligned LCEs in each of the cured portions may be different from the respective orientations of the aligned LCEs in the other cured portions. The illustrations of FIG. 4C are by way of example only and are not meant to be limiting in any way.

Figure 5:
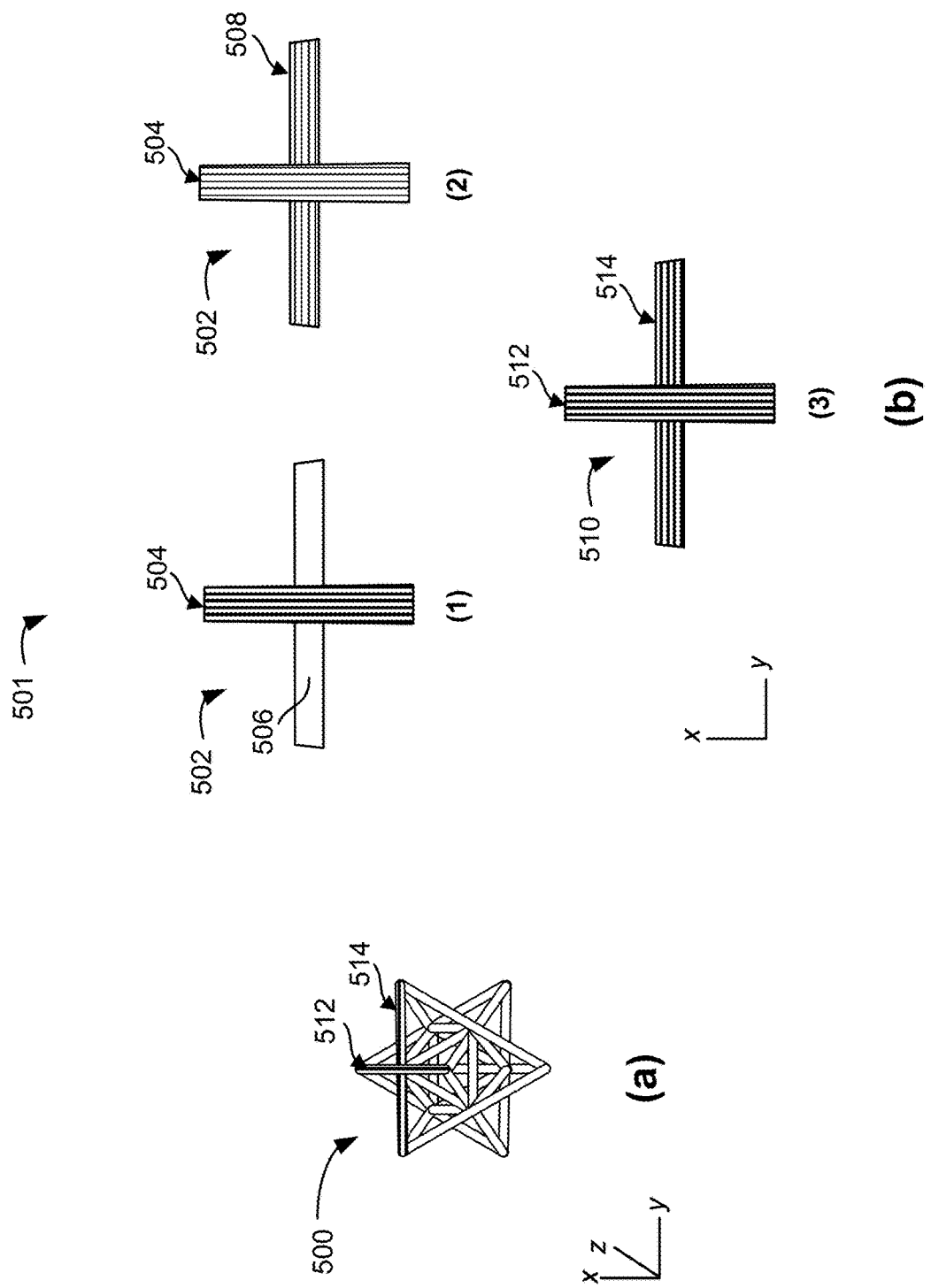
FIG. 5 is a schematic drawing of photoalignment of LCs in portions of a complex three-dimensional structure, according to one embodiment. Part (a) depicts a three-dimensional structure having distinct portion of aligned LCs, and part (b) depicts a process of aligning LC oligomers in distinct portions of a layer of the three-dimensional structure of part (a).

In another approach, the LC oligomers of another voxel of a layer are aligned in an orientation that is different than the orientation of aligned LC oligomers in a first voxel of the same layer. A 3D structure formed by SLA using the LCE alignment process as described herein may have a complex shape, e.g., an octet truss, a gyroid, etc. that include features, voxels, regions, portions, etc. that have LCs substantially aligned to a predefined orientation for each feature, voxel, region, portion, etc., respectively. In an exemplary approach, a structure is comprised of a plurality of layers, e.g., 2D slices, comprising multiple defined LC alignment orientations. For example, a complex 3D structure, e.g., an octet truss as illustrated in FIG. 5, has at least two portions in one plane of the 3D structure that have different predefined monodomain of substantially aligned LCE. In part (a) the complex geometric 3D structure 500 has at least two portions 512, 514, each portion having a monodomain of aligned LCs, the two portions 512, 514 being in one plane of the 3D structure 500.

A method 501, as illustrated in part (b), is described that forms a structure having two distinct voxels of aligned LCEs in one plane, each having LCs substantially aligned according to a respective predefined orientation. The schematic drawing in subpart (1) illustrates a layer 502 of resin 506 formed in a plane according to a predefined pattern. The resin 506 is comprised of unaligned LC oligomers and a photoinitiator. An initial operation of aligning the LC oligomers includes directing a light to predefined portion of the photoalignment material (not shown) that is contacting the layer 502 of resin 506. The illuminated predefined portion of the photoalignment material causes the LC oligomers of the resin contacting the predefined portion to align according to the orientation of the alignment of the predefined portion of the photoalignment material. The LC oligomers of the first portion 504 of the layer 502 contacting the photoalignment material substantially align to the predefined orientation.

As illustrated in subpart (2), the LC oligomers of a second portion 508 of the layer 502 may be substantially aligned to a different orientation before curing the layer to set the aligned LCs in the LCE matrix of the layer. After aligning the LC oligomers of the first portion 504, the polarity of the light for photo aligning the molecules of the photoalignment material is changed to result in a predefined orientation of alignment different than the orientation of the first portion 504. In one approach, another light may be used with the desired polarity for the next exposure. As described herein, a next portion of the layer of photoalignment material (not shown) is exposed to the light for aligning the next portion of the photoalignment material in a different orientation corresponding to a different polarity than the first orientation. The molecules of the next portion of the layer of photoalignment material are unaligned prior to exposure to the next polarity of the first light.

The LC oligomers of the second portion 508 of the layer 502 of resin 506 contacting the illuminated next portion of the photoalignment material substantially align to the different orientation of the next portion of the photoalignment material. The illuminated predefined portion of the photoalignment material causes the LC oligomers of the resin contacting the predefined portion to align according to the orientation of the alignment of the next portion of the photoalignment material. The LC oligomers of the second portion 508 of the layer 502 contacting the photoalignment material substantially align to the different orientation.

As illustrated in subpart (3), the cured layer 510 has been exposed to a light for curing the resin to set the alignment of the LCs such that each predefined portion 512, 514 of the cured layer 510 includes cured LCEs substantially aligned according to their respective orientations. The orientation(s) of alignment in each layer of resin may correspond to a predefined pattern of an associated layer of a 3D model. The method includes changing the polarity of the light for aligning the photoalignment material and in turn aligning the contacting LC oligomers of a portion according to a predefined pattern of a 3D model of the object.

In another approach, a first portion of aligned LC oligomers may be selectively cured with the curing light, e.g., exposing the first portion only to the light for curing the resin to set the alignment of the LCs, before aligning the LC oligomers of the second portion of the layer. Curing each portion of aligned LC oligomers directly following alignment of the LC oligomers of the respective portion may provide a smoother transition between adjacent portions of a layer.

Figure 6:
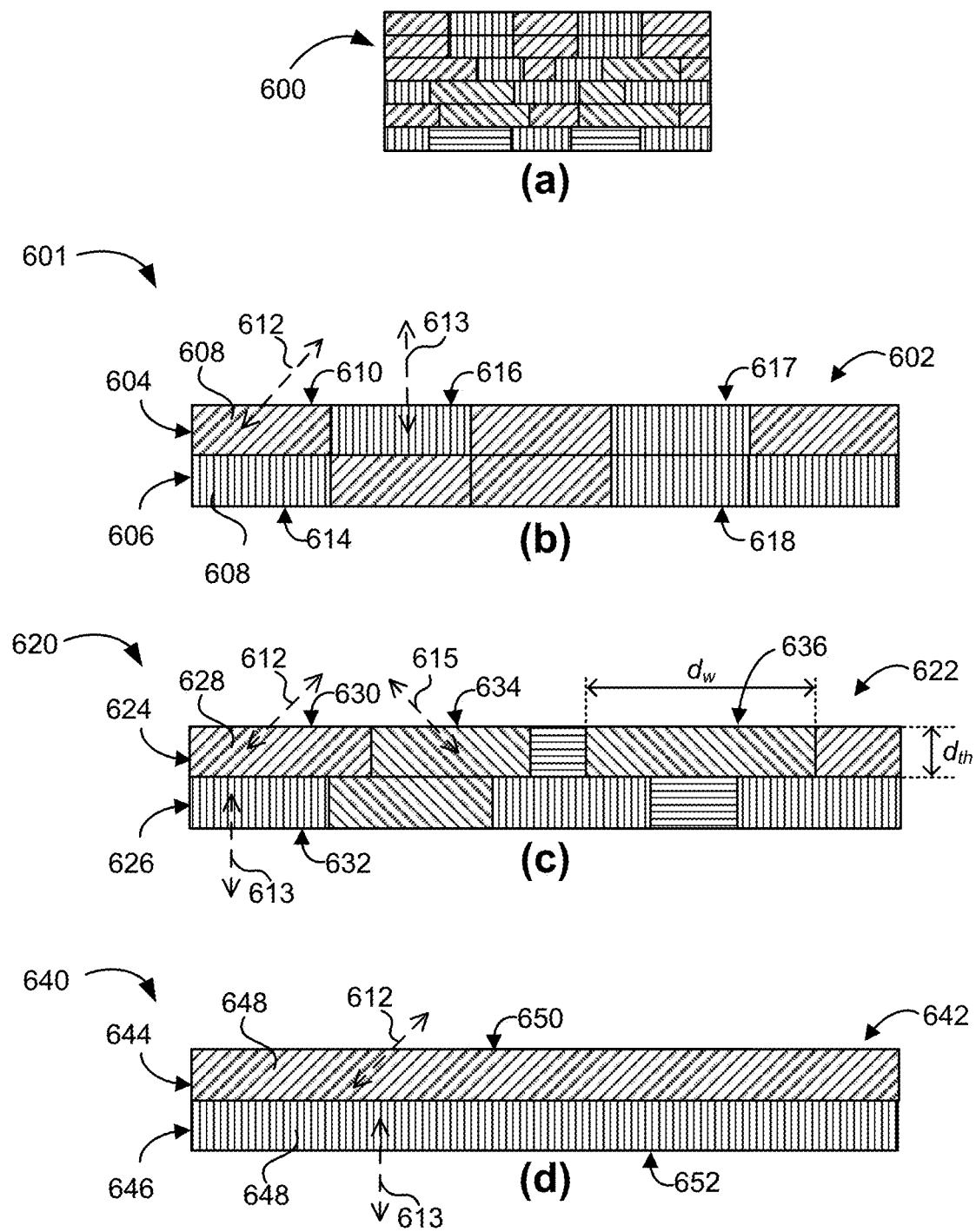
FIG. 6 is a series of schematic drawings of three-dimensional (3D) structures, according to various embodiments. Part (a) is a schematic drawing of a portion of a 3D structure having a plurality of layers, part (b) is a schematic drawing of a portion of a 3D structure having the LCEs substantially aligned in a predefined orientation in respective voxels in the first and second layers, part (c) is a schematic drawing of a portion of a 3D structure showing two layers having different voxels comprising substantially aligned LCs in a respective orientation in voxel in the first and second layers, part (d) is a schematic drawing of a portion of a 3D structure with each layer having unidirectional alignment of LCs across the entire layer.

FIG. 6 depicts a series of schematic diagrams of a side view of a portion of products 600, 601, 620, 640 in accordance with various embodiments. As an option, the present products 600, 601, 620, 640 may be implemented in conjunction with features from any other inventive concept listed herein, such as those described with reference to the other FIGS. Of course, however, such products 600, 601, 620, 640 and others presented herein may be used in various applications and/or in permutations which may or may not be specifically described in the illustrative embodiments listed herein. Further, the product 600, 601, 620, 640 presented herein may be used in any desired environment.

According to one embodiment, a 3D structure has a plurality of layers comprised of LCEs. A plurality of layers may be defined as a product having more than one layer, for example, two layers, three layers, four layers, etc. In various approaches, the number of layers is determined by a predefined 3D model of the product. For example, as illustrated in part (a) of FIG. 6, a portion of a 3D structure 600 has a plurality of layers, each layer having a plurality of voxels, and each voxel comprising LCEs substantially aligned to a predefined orientation. The alignment orientation of the LCEs in parts (a) through (d) represent alignment of LCEs parallel to the plane of deposition of each layer. Each pattern illustrated in the figures represents a predefined alignment orientation but is not meant to define an orientation and thus each pattern is for illustration purposes only.

Part (b) of FIG. 6 illustrates a schematic drawing of a portion of product 601 having a plurality of sequentially-formed layers, showing two layers 604, 606 in the illustrated portion, comprised of LCEs 608. In one approach, the 3D structure 602 has a layer 604 comprised of LCEs 608 present in at least a predefined portion 610, e.g., a voxel. The LCEs 608 in a portion 610 of a first layer 604 are substantially aligned in a predefined first orientation 612. In one approach, a majority of, and preferably at least 90% of, the LCEs 608 in a predefined portion 610 are substantially aligned in a predefined first orientation 612 relative to some reference, e.g., the plane of deposition of the layer. For example, as used in some approaches described herein, orientations being substantially aligned with a direction of the means, e.g., the LC molecule, mesogens, etc. that the mean longitudinal axes of the items so oriented are, on average, within 45° of the direction, preferably within 30° of the direction, more preferably within 15° of the direction, ideally within 10° of the direction.

In one approach, a predefined orientation of the LC oligomers of the LCE may be selected from a 360° alignment control in an x-y plane. For example, the orientation direction may be any one of an orientation in a 360° rotation of the theta direction. The predefined first orientation 612 may be different than the orientation of the as-deposited alignment of the LCEs 608.

In one approach, the 3D structure 602 includes a second layer 606 adjacent the layer 604. The LCEs 608 in a predefined portion 614 of the second 606 of the layers are substantially aligned in a predefined second orientation 613 that may be different than the first orientation. For example, the second orientation is different than the first orientation by at least 0.5°, at least 1°, at least 2°, at least 5°, at least 15°, etc. and in some approaches up to 90°.

In one approach, LCEs 608 in another portion 617 of the first layer 604 have the second orientation 613 the same as the predefined orientation of the LCEs of another portion 618 of the second layer 606, where the second orientation 613 is different than the orientation of the as-deposited alignment of the LCEs 608. The as-deposited alignment of the LCEs may be defined as the orientation of the LCEs following deposition of the resin during formation of a layer. In some approaches, the orientation of the as-deposited LCEs during formation of the layer may include non-specific, isotropic, orientations of the LCEs in the absence of any aligning effects (e.g., magnetic field, photoalignment, etc.).

In one approach, the LCEs 608 in a predefined second portion 616 of the first layer 604 are substantially aligned in a predefined orientation 613 that may be different than the predefined first orientation 612 of the LCEs 608 in the portion 610 of the first layer 604.

In one embodiment, as illustrated in a schematic drawing of a portion of a product 620 in part (c), a 3D structure 622 has a plurality of sequentially-formed layers 624, 626 comprised of LCEs 628 where the LCEs of each of the portions of each of the layers are substantially aligned in an orientation specific to each portion, respectively. For example, the LCEs 628 present in one portion 630 of a first layer 624 are substantially aligned in a predefined first orientation 612. As described herein, a majority of, and preferably at least 90% of, the LCEs 628 in each portion are substantially aligned (e.g., within 10° of each other, preferably) in the respective orientation direction relative to some reference, e.g., the plane of deposition of the layer. In one approach, a predefined orientation may be selected from a 180° alignment control, e.g., the orientation direction may be any one of radial x-y planar direction in a 180° rotation. Each predefined orientation of the LCEs for each portion is different than the as-deposited alignment direction of the LCEs.

In some approaches, the LCEs in a predefined second portion of the layer are substantially aligned to a different orientation than the LCEs of a different, adjacent, etc. portion of the same layer. For example, adjacent to the first portion 630, LCEs 628 in a second portion 634 of the first layer 624 are substantially aligned in an orientation 615 that is different than the first orientation 612 of the LCEs 628 in the portion 630.

In the second layer 626, the LCEs 628 in another portion 632 are substantially aligned in an orientation 613 that may be different than the first orientation 612 and different than the orientation 615. Further, each of the orientations 612, 613, 615 are different than the non-specific orientation of the as-deposited alignment of the LCEs 628.

According to various embodiments, the lithography-based technique of using a DMD to define each voxel of a printed layer allows the printed 3D structure to have a contiguous region of aligned LCEs in one of the portion has a maximum dimension in the 10s of microns. In some approaches, the maximum dimensions (e.g., height, width, depth) of the contiguous region is substantially equal to the dimensions of a voxel of the printed structure. In an exemplary approach, a contiguous region of aligned LCEs has a maximum dimension of less than 60 µm. For example, a contiguous region of aligned LCEs 628 of portion 636 of layer 624 has a maximum dimension, e.g., width $d_w$, thickness, $d_{th}$, etc. of less than 60 µm.

The minimum dimension of the build area may be specific to the lithography system. The minimum dimension may be determined by the magnification of the image of the DMD on the respective lithography system. For example, a PµSL (Lawrence Livermore National Security, Livermore, CA) system may have a DMD micromirrors having a dimension of 1.2 µm, and thus, a pixel size of the minimum dimension may be greater than about 1.2 µm. In another example, a large area 3D printer, Large Area Projection Micro Stereolithography (LAPµSL) system (Lawrence Livermore National Security, Livermore, CA) has DMD micromirrors having a dimension of 10.2 µm, and thus, a pixel size of the minimum dimension may be greater than 10.2 µm.

A theoretical diffraction limit for a system using light in the wavelength ranges as described herein may be approximately half the wavelength. For example, half the wavelength of an alignment light of 470 nm is about 230 nm. However, without wishing to be bound by any theory, a reasonable diffraction limit may be one wavelength of the alignment light, for example, 470 nm. In some approaches, a maximum dimension may be greater than 500 nanometers (nm).

According to one embodiment, as illustrated in a schematic drawing of a portion of product 640 in part (d), a 3D structure 642 has a plurality of sequentially-formed layers 644, 646 comprised of LCEs 648 where a portion may extend along the entire layer. For example, the LCEs 648 present in the first 644 of the layers are substantially aligned in a predefined first orientation 612 and a portion 650 extends along the entire layer 644. The LCEs 648 present in the second 646 layer are substantially aligned in a predefined second orientation 613 and a portion 652 extends along the entire layer 646. In one approach, the LCEs 648 in the second layer 646 are substantially aligned in an orientation that may be different than the orientation of the LCEs 648 in the first layer 644.

The illustrations of FIG. 6 are by way of example only and are not meant to be limiting in any way. Each embodiment may have a plurality of sequentially formed layers and a plurality of portions, e.g., voxels, per layer as determined by the 3D model of the structure being printed, and each orientation of the LCEs for each of the portions may be predefined according to the application of the structure.

According to various embodiments, the formed 3D structure is characterized as exhibiting a shape change in response to a stimulus. In various approaches, each of the portions of the 3D structure may be characterized as exhibiting a shape change in response to a stimulus. The shape change may be realized with a formulation having a high actuation strain %, e.g., up to about 50% strain. The shape change may be reversible. In one approach, the shape change is represented by a greater than 5% volumetric change of the 3D structure. In one approach the shape change is represented by a greater than 5% change in at least one dimension of the 3D structure, e.g., the length in a longitudinal direction, the width perpendicular to the length of the 3D structure, the thickness of the 3D structure, etc.

Figure 7:
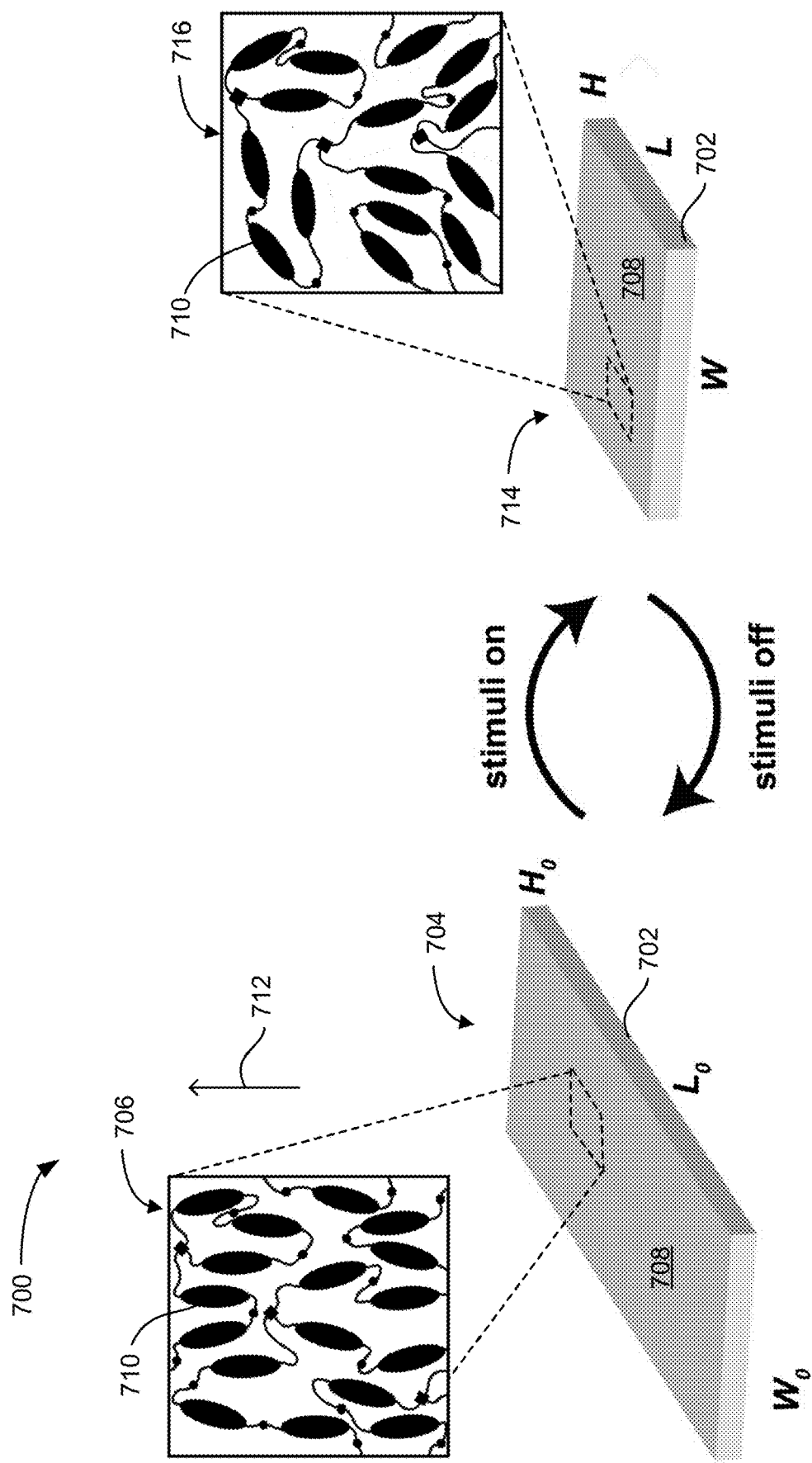
FIG. 7 is a schematic drawing of an actuation of a LCE structure, according to one embodiment.

FIG. 7 depicts a schematic drawing of an actuation 700 of an LCE structure 702, according to one approach. A structure 702 in an as-formed state 704 has a width Wo, length $L_O$, and height $H_O$. In the magnified view 706 of the LCE matrix 708, the LC molecules 710 in a nematic state such that the LC molecules 710 are substantially aligned according to a predefined orientation 712. Upon stimulation of the LCE structure 702, the LCE structure 702 undergoes a shape change such that the stimulated form 714 of the LCE structure 702 now has change in width W and height H, and in particular a significant change in the length L of the structure. The magnified view 716 of the LCE matrix 708 shows the LC molecules 710 are oriented in an unaligned isotropic state. Removing the stimulant, turning off the stimuli, etc. causes the LCE structure 702 to return to the resting, as-formed state 704 in which the LC molecules 710 are substantially aligned along a predefined orientation 712.

In Use

Various embodiments described herein may be developed for reversible and repeatable 3D-to-3D shape change, adaptive optics, soft robotics, tunable stiffness architectures, cellular fluidics, fluid filter, stimuli responsive behavior, etc. Various embodiments described herein utilize liquid crystal elastomer alignment, 4D printing, responsive 3D structures, voxel-by-voxel shape change-directed printing, etc.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed:

1. A method of forming a three-dimensional structure comprising liquid crystal elastomers, the method comprising:
    contacting a first layer of resin with a layer of photoalignment material, the resin comprising liquid crystal oligomers and a photoinitiator;
    exposing a first portion of the layer of photoalignment material to a first light for aligning the first portion of the layer of photoalignment material in a first orientation corresponding to a polarity of the first light,
        wherein the liquid crystal oligomers adjacent the illuminated first portion of the layer of photoalignment material align to the first orientation of the first portion of the layer of photoalignment material;

exposing the aligned liquid crystal oligomers of the first layer of resin for curing the aligned liquid crystal oligomers thereby forming a cured portion of the first layer of resin; and forming at least one additional layer by repeating the following operations for each additional layer:

creating a relative movement of the previously formed layer away from the photoalignment material, wherein the relative movement includes adding another layer of resin onto the previously formed layer;

contacting the another layer of the resin with the layer of photoalignment material;

exposing another portion of the layer of photoalignment material to the first light for aligning the another portion of the layer of photoalignment material in an orientation that is different than the first orientation, wherein the liquid crystal oligomers adjacent the illuminated another portion of the layer of photoalignment material align to the orientation of the another portion of the layer of photoalignment material; and exposing the aligned liquid crystal oligomers of the another layer of resin for curing the aligned liquid crystal oligomers thereby forming a cured portion of the another layer of resin.

2. The method as recited in claim 1, wherein the orientation(s) of alignment in each layer of resin correspond to a predefined pattern of an associated layer of a three-dimensional (3D) model, wherein molecules of the photoalignment material are aligned in the respective orientation corresponding to a polarity of the first light applied thereto as defined, at least in part, by a rotational orientation of the polarizer in the path of the first light.

3. The method as recited in claim 2, wherein a polarization angle of the first light is selected to specify each orientation of alignment corresponding to the predefined pattern of an associated layer of the three-dimensional (3D) model.

4. The method as recited in claim 3, wherein a minimum difference between the polarization angles of two respective orientations is at least one degree.

5. The method as recited in claim 1, comprising, after exposing the first portion of the layer of photoalignment material to the first light and before curing the aligned liquid crystal oligomers of the first layer:

changing a polarity of the first light; and exposing a next portion of the layer of the photoalignment material to the first light for aligning the next portion of the layer of photoalignment material in a different orientation than the first orientation, wherein the liquid crystal oligomers adjacent the illuminated next portion of the layer of the photo alignment material align to the different orientation of the next portion of the layer of photoalignment material.

6. The method as recited in claim 5, wherein the next portion of the layer of photoalignment material is located by moving the layer of photoalignment material in an x-direction and/or a y-direction, and the x-y directions are in a plane that is perpendicular to a z-direction, wherein the next portion of the layer of photoalignment material comprises unaligned molecules.

7. The method as recited in claim 1, wherein at least three layers are formed, each layer having a cured portion of cured liquid crystal elastomers, the cured portions being stacked upon one another in a direction perpendicular to a plane of the layers.

8. The method as recited in claim 7, wherein the orientation of the aligned liquid crystal elastomers in each of the cured portions is different from the respective orientations of the aligned liquid crystal elastomers in the other cured portions.

9. The method as recited in claim 1, wherein a wavelength of the first light for aligning molecules of the photoalignment material is in a range of greater than about 390 nanometers to about 500 nanometers.

10. The method as recited in claim 1, wherein the curing the aligned liquid crystal oligomers comprises exposing the aligned liquid crystal oligomers to a second light at a wavelength in a range of greater than about 350 nanometers to about 390 nanometers.

11. The method as recited in claim 1, wherein the photoinitiator does not initiate polymerization of the resin at a wavelength of the first light.

12. The method as recited in claim 1, wherein a composition of the photoalignment material includes at least one component selected from the group consisting of azobenzene and an organogel.

13. The method as recited in claim 1, comprising heating the resin to a temperature below the nematic-to-isotropic transition temperature of the liquid crystal oligomers for lowering a viscosity of the resin.

14. The method as recited in claim 1, wherein the three-dimensional structure is formed using a lithography-based additive manufacturing system.

15. The method as recited in claim 1, comprising using a digital micromirror device to define the portions of the layer of photoalignment material for exposure to the first light.

16. The method as recited in claim 1, wherein each cured portion comprises at least one voxel.

17. The method as recited in claim 1, wherein the resin includes a photoinhibitor.

* * * * *